United States Patent
Brennan et al.

(10) Patent No.: US 12,472,726 B2
(45) Date of Patent: *Nov. 18, 2025

(54) LAMINATING THIN STRENGTHENED GLASS TO CURVED MOLDED PLASTIC SURFACE FOR DECORATIVE AND DISPLAY COVER APPLICATION

(71) Applicant: CORNING INCORPORATED, Corning, NY (US)

(72) Inventors: Michael Timothy Brennan, Painted Post, NY (US); Yawei Sun, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 334 days.

This patent is subject to a terminal disclaimer.

(21) Appl. No.: 18/117,027

(22) Filed: Mar. 3, 2023

(65) Prior Publication Data
US 2023/0202149 A1 Jun. 29, 2023

Related U.S. Application Data

(63) Continuation of application No. 17/580,085, filed on Jan. 20, 2022, now Pat. No. 11,613,106, which is a (Continued)

(51) Int. Cl.
*B32B 17/10* (2006.01)
*B29C 45/14* (2006.01)

(52) U.S. Cl.
CPC .. *B32B 17/10889* (2013.01); *B29C 45/14065* (2013.01); *B29C 45/1418* (2013.01); (Continued)

(58) Field of Classification Search
CPC ........ B32B 17/10889; B32B 17/10568; B32B 17/10651; B32B 17/10036; (Continued)

(56) References Cited

U.S. PATENT DOCUMENTS 2,068,030 A 1/1937 Lieser
2,403,060 A 7/1946 Downes
(Continued)

FOREIGN PATENT DOCUMENTS

CN 1111906 A 11/1995
CN 1587132 A 3/2005
(Continued)

OTHER PUBLICATIONS

"Curved Glass: an obstacle or opportunity in glass architecture", Retrieved from: https://www.glastory.net/tag/safety-glass/, 2015, 16 pages.
(Continued)

*Primary Examiner* — Christopher W Raimund
(74) *Attorney, Agent, or Firm* — Daniel J. Greenhalgh

(57) ABSTRACT

A process comprises cold-forming a flat glass substrate into a non-planar shape using a die. The cold-formed glass substrate is bonded to a non-planar rigid support structure at a plurality of non-planar points using the die. Bonding methods include injection molding the non-planar rigid support structure, and direct bonding. An article is also provided, comprising a cold-formed glass substrate having opposing major surfaces and a curved shape, the opposing major surfaces comprising a surface stress that differ from one another. The cold-formed glass substrate is attached to a rigid support structure having the curved shape. The cold-formed glass substrate includes an open region not in direct contact with the non-planar rigid support structure, and the open region has a curved shape maintained by the non-planar rigid support structure.

20 Claims, 17 Drawing Sheets

Related U.S. Application Data continuation of application No. 17/007,757, filed on Aug. 31, 2020, now Pat. No. 11,331,886, which is a continuation of application No. 16/312,797, filed as application No. PCT/US2017/039752 on Jun. 28, 2017, now Pat. No. 11,338,556.

(60) Provisional application No. 62/444,470, filed on Jan. 10, 2017, provisional application No. 62/355,542, filed on Jun. 28, 2016.

(52) U.S. Cl.
CPC .. *B32B 17/10568* (2013.01); *B32B 17/10651* (2013.01); *B29C 2045/14114* (2013.01)

(58) Field of Classification Search
CPC ........ B32B 17/10743; B32B 17/10761; B32B 17/1077; B32B 17/10788; B32B 2037/243; B32B 1/00; B32B 7/12; B32B 17/10137; B32B 17/10862; B32B 38/0008; B32B 38/145; B29C 45/14065; B29C 45/1418; B29C 2045/14114; B29C 45/14778; C03B 23/023; C03B 23/0235; C03C 17/002; C03C 2217/73; B60R 13/02; G09F 9/30

See application file for complete search history.

(56) References Cited

U.S. PATENT DOCUMENTS

| | | |
|---|---|---|
| 2,608,030 A | 8/1952 | Jendrisak |
| 3,197,903 A | 8/1965 | Walley |
| 3,338,696 A | 8/1967 | Dockerty |
| 3,582,456 A | 6/1971 | Stolki |
| 3,682,609 A | 8/1972 | Dockerty |
| 3,753,840 A | 8/1973 | Plumat |
| 3,778,335 A | 12/1973 | Boyd |
| 3,790,430 A | 2/1974 | Mochel |
| 3,799,817 A | 3/1974 | Laethem |
| 4,147,527 A | 4/1979 | Bystrov et al. |
| 4,238,265 A | 12/1980 | Deminet |
| 4,445,953 A | 5/1984 | Hawk |
| 4,455,338 A | 6/1984 | Henne |
| 4,802,903 A | 2/1989 | Kuster et al. |
| 4,859,636 A | 8/1989 | Aratani et al. |
| 4,899,507 A | 2/1990 | Mairlot |
| 4,969,966 A | 11/1990 | Norman |
| 4,985,099 A | 1/1991 | Mertens et al. |
| 5,108,480 A | 4/1992 | Sugiyama |
| 5,154,117 A | 10/1992 | Didelot et al. |
| 5,173,102 A | 12/1992 | Weber et al. |
| 5,245,468 A | 9/1993 | Demiryont et al. |
| 5,250,146 A | 10/1993 | Horvath |
| 5,264,058 A | 11/1993 | Hoagland et al. |
| 5,300,184 A | 4/1994 | Masunaga |
| 5,711,119 A | 1/1998 | Cornils et al. |
| 5,897,937 A | 4/1999 | Cornils et al. |
| 6,044,662 A | 4/2000 | Morin |
| 6,086,983 A | 7/2000 | Yoshizawa |
| 6,101,748 A | 8/2000 | Cass et al. |
| 6,242,931 B1 | 6/2001 | Hembree et al. |
| 6,265,054 B1 | 7/2001 | Bravet et al. |
| 6,270,605 B1 | 8/2001 | Doerfler |
| 6,274,219 B1 | 8/2001 | Schuster et al. |
| 6,287,674 B1 | 9/2001 | Verlinden et al. |
| 6,302,985 B1 | 10/2001 | Takahashi et al. |
| 6,305,492 B1 | 10/2001 | Oleiko et al. |
| 6,332,690 B1 | 12/2001 | Murofushi |
| 6,387,515 B1 | 5/2002 | Joret et al. |
| 6,420,800 B1 | 7/2002 | Levesque et al. |
| 6,426,138 B1 | 7/2002 | Narushima et al. |
| 6,582,799 B1 | 6/2003 | Brown et al. |
| 6,620,365 B1 | 9/2003 | Odoi et al. |
| 6,816,225 B2 | 11/2004 | Colgan et al. |
| 6,903,871 B2 | 6/2005 | Page |
| 7,297,040 B2 | 11/2007 | Chang et al. |
| 7,375,782 B2 | 5/2008 | Yamazaki et al. |
| 7,478,930 B2 | 1/2009 | Choi |
| 7,489,303 B1 | 2/2009 | Pryor |
| 7,542,302 B1 | 6/2009 | Curnalia et al. |
| 7,750,821 B1 | 7/2010 | Taborisskiy et al. |
| 7,955,470 B2 | 6/2011 | Kapp et al. |
| 8,298,431 B2 | 10/2012 | Chwu et al. |
| 8,344,369 B2 | 1/2013 | Yamazaki et al. |
| 8,521,955 B2 | 8/2013 | Arulambalam et al. |
| 8,549,885 B2 | 10/2013 | Dannoux et al. |
| 8,586,492 B2 | 11/2013 | Barefoot et al. |
| 8,652,978 B2 | 2/2014 | Dejneka et al. |
| 8,692,787 B2 | 4/2014 | Imazeki |
| 8,702,253 B2 | 4/2014 | Lu et al. |
| 8,765,262 B2 | 7/2014 | Gross |
| 8,814,372 B2 | 8/2014 | Vandal et al. |
| 8,833,106 B2 | 9/2014 | Dannoux et al. |
| 8,912,447 B2 | 12/2014 | Leong et al. |
| 8,923,693 B2 | 12/2014 | Yeates |
| 8,962,084 B2 | 2/2015 | Brackley et al. |
| 8,967,834 B2 | 3/2015 | Timmerman et al. |
| 8,969,226 B2 | 3/2015 | Dejneka et al. |
| 8,978,418 B2 | 3/2015 | Balduin et al. |
| 9,007,226 B2 | 4/2015 | Chang |
| 9,061,934 B2 | 6/2015 | Bisson et al. |
| 9,090,501 B2 | 7/2015 | Okahata et al. |
| 9,109,881 B2 | 8/2015 | Roussev et al. |
| 9,140,543 B1 | 9/2015 | Allan et al. |
| 9,156,724 B2 | 10/2015 | Gross |
| 9,223,162 B2 | 12/2015 | Deforest et al. |
| 9,240,437 B2 | 1/2016 | Shieh et al. |
| 9,278,500 B2 | 3/2016 | Filipp |
| 9,278,655 B2 | 3/2016 | Jones et al. |
| 9,290,413 B2 | 3/2016 | Dejneka et al. |
| 9,346,703 B2 | 5/2016 | Bookbinder et al. |
| 9,346,706 B2 | 5/2016 | Bazemore et al. |
| 9,357,638 B2 | 5/2016 | Lee et al. |
| 9,442,028 B2 | 9/2016 | Roussev et al. |
| 9,446,723 B2 | 9/2016 | Stepanski |
| 9,469,561 B2 | 10/2016 | Kladias et al. |
| 9,517,967 B2 | 12/2016 | Dejneka et al. |
| 9,573,843 B2 | 2/2017 | Keegan et al. |
| 9,593,042 B2 | 3/2017 | Hu et al. |
| 9,595,960 B2 | 3/2017 | Wilford |
| 9,606,625 B2 | 3/2017 | Levesque et al. |
| 9,617,180 B2 | 4/2017 | Bookbinder et al. |
| 9,663,396 B2 | 5/2017 | Miyasaka et al. |
| 9,694,570 B2 | 7/2017 | Levasseur et al. |
| 9,700,985 B2 | 7/2017 | Kashima et al. |
| 9,701,564 B2 | 7/2017 | Bookbinder et al. |
| 9,720,450 B2 | 8/2017 | Choi et al. |
| 9,724,727 B2 | 8/2017 | Domey et al. |
| 9,802,485 B2 | 10/2017 | Masuda et al. |
| 9,815,730 B2 | 11/2017 | Marjanovic et al. |
| 9,821,509 B2 | 11/2017 | Kastell |
| 9,895,975 B2 | 2/2018 | Lee et al. |
| 9,902,640 B2 | 2/2018 | Dannoux et al. |
| 9,931,817 B2 | 4/2018 | Rickerl |
| 9,933,820 B2 | 4/2018 | Helot et al. |
| 9,947,882 B2 | 4/2018 | Zhang et al. |
| 9,955,602 B2 | 4/2018 | Wildner et al. |
| 9,957,190 B2 | 5/2018 | Finkeldey et al. |
| 9,963,374 B2 | 5/2018 | Jouanno et al. |
| 9,972,645 B2 | 5/2018 | Kim |
| 9,975,801 B2 | 5/2018 | Maschmeyer et al. |
| 9,992,888 B2 | 6/2018 | Moon et al. |
| 10,005,246 B2 | 6/2018 | Stepanski |
| 10,017,033 B2 | 7/2018 | Fisher et al. |
| 10,042,391 B2 | 8/2018 | Yun et al. |
| 10,074,824 B2 | 9/2018 | Han et al. |
| 10,086,762 B2 | 10/2018 | Uhm |
| 10,131,118 B2 | 11/2018 | Kang et al. |
| 10,140,018 B2 | 11/2018 | Kim et al. |
| 10,153,337 B2 | 12/2018 | Lee et al. |
| 10,175,802 B2 | 1/2019 | Boggs et al. |
| 10,211,416 B2 | 2/2019 | Jin et al. |

(56) References Cited

U.S. PATENT DOCUMENTS

| | | |
|---|---|---|
| 10,222,825 B2 | 3/2019 | Wang et al. |
| 10,273,184 B2 | 4/2019 | Garner et al. |
| 10,303,223 B2 | 5/2019 | Park et al. |
| 10,303,315 B2 | 5/2019 | Jeong et al. |
| 10,326,101 B2 | 6/2019 | Oh et al. |
| 10,328,865 B2 | 6/2019 | Jung |
| 10,343,377 B2 | 7/2019 | Levasseur et al. |
| 10,347,700 B2 | 7/2019 | Yang et al. |
| 10,377,656 B2 | 8/2019 | Dannoux et al. |
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |
| 10,500,958 B2 | 12/2019 | Cho et al. |
| 10,549,704 B2 | 2/2020 | Mcfarland |
| 10,606,395 B2 | 3/2020 | Boggs et al. |
| 10,649,267 B2 | 5/2020 | Tuan et al. |
| 10,712,850 B2 | 7/2020 | Brandao et al. |
| 10,732,753 B2 | 8/2020 | Boggs et al. |
| 10,788,707 B2 | 9/2020 | Al et al. |
| 10,976,607 B2 | 4/2021 | Huang et al. |
| 11,016,590 B2 | 5/2021 | Brandao et al. |
| 11,331,886 B2 | 5/2022 | Brennan et al. |
| 11,613,106 B2 * | 3/2023 | Brennan ............ B32B 17/10761 156/102 |
| 2002/0039229 A1 | 4/2002 | Hirose et al. |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0258929 A1 | 12/2004 | Glaubitt et al. |
| 2005/0178158 A1 | 8/2005 | Moulding et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |
| 2007/0210621 A1 | 9/2007 | Barton et al. |
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0015747 A1 | 1/2009 | Nishizawa et al. |
| 2009/0046240 A1 | 2/2009 | Bolton |
| 2009/0096937 A1 | 4/2009 | Bauer et al. |
| 2009/0096965 A1 | 4/2009 | Nagata |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2010/0247977 A1 | 9/2010 | Tsuchiya et al. |
| 2011/0057465 A1 | 3/2011 | Beau et al. |
| 2011/0078832 A1 | 3/2011 | Koecher et al. |
| 2011/0148267 A1 | 6/2011 | Mcdaniel et al. |
| 2011/0305869 A1 | 12/2011 | Pollak et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0234581 A1 | 8/2014 | Immerman et al. |
| 2014/0308464 A1 | 10/2014 | Levasseur et al. |
| 2014/0312518 A1 | 10/2014 | Levasseur et al. |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0166394 A1 | 6/2015 | Marjanovic et al. |
| 2015/0168768 A1 | 6/2015 | Nagatani |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 10/2015 | Rogers et al. |
| 2015/0322270 A1 | 11/2015 | Amin et al. |
| 2015/0336357 A1 | 11/2015 | Kang et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0272529 A1 | 9/2016 | Hong et al. |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | Mcfarland |
| 2017/0213872 A1 | 7/2017 | Jinbo et al. |

(56) References Cited

U.S. PATENT DOCUMENTS

| | | | |
|---|---|---|---|
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0329182 A1 | 11/2017 | Privitera et al. |
| 2017/0334770 A1 | 11/2017 | Luzzato et al. |
| 2017/0349473 A1 | 12/2017 | Moriya et al. |
| 2018/0009197 A1 | 1/2018 | Gross et al. |
| 2018/0014420 A1 | 1/2018 | Amin et al. |
| 2018/0031743 A1 | 2/2018 | Wakatsuki et al. |
| 2018/0050948 A1 | 2/2018 | Faik et al. |
| 2018/0069053 A1 | 3/2018 | Bok |
| 2018/0072022 A1 | 3/2018 | Tsai et al. |
| 2018/0103132 A1 | 4/2018 | Prushinskiy et al. |
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1 | 5/2018 | Jacques |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1 | 7/2018 | Kumar et al. |
| 2018/0188869 A1 | 7/2018 | Boggs et al. |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |
| 2018/0245125 A1 | 8/2018 | Tsai et al. |
| 2018/0290438 A1 | 10/2018 | Notsu et al. |
| 2018/0304825 A1 | 10/2018 | Mattelet et al. |
| 2018/0324964 A1 | 11/2018 | Yoo et al. |
| 2018/0345644 A1 | 12/2018 | Kang et al. |
| 2018/0364760 A1 | 12/2018 | Ahn et al. |
| 2018/0374906 A1 | 12/2018 | Everaerts et al. |
| 2019/0034017 A1 | 1/2019 | Boggs et al. |
| 2019/0039352 A1 | 2/2019 | Zhao et al. |
| 2019/0039935 A1 | 2/2019 | Couillard et al. |
| 2019/0069451 A1 | 2/2019 | Myers et al. |
| 2019/0077337 A1 | 3/2019 | Gervelmeyer |
| 2019/0152831 A1 | 5/2019 | An et al. |
| 2019/0223309 A1 | 7/2019 | Amin et al. |
| 2019/0295494 A1 | 9/2019 | Wang et al. |
| 2019/0315648 A1 | 10/2019 | Kumar et al. |
| 2019/0329531 A1 | 10/2019 | Brennan et al. |
| 2020/0064535 A1 | 2/2020 | Haan et al. |
| 2020/0301192 A1 | 9/2020 | Huang et al. |
| 2021/0055599 A1 | 2/2021 | Chen et al. |

FOREIGN PATENT DOCUMENTS

| | | |
|---|---|---|
| CN | 1860081 A | 11/2006 |
| CN | 101320182 A | 12/2008 |
| CN | 101496083 A | 7/2009 |
| CN | 101600846 A | 12/2009 |
| CN | 101684032 A | 3/2010 |
| CN | 201989544 U | 9/2011 |
| CN | 102333664 A | 1/2012 |
| CN | 102341356 A | 2/2012 |
| CN | 102464456 A | 5/2012 |
| CN | 102566841 A | 7/2012 |
| CN | 103136490 A | 6/2013 |
| CN | 103587161 A | 2/2014 |
| CN | 203825589 U | 9/2014 |
| CN | 204111583 U | 1/2015 |
| CN | 104380715 A | 2/2015 |
| CN | 104656999 A | 5/2015 |
| CN | 104679341 A | 6/2015 |
| CN | 204439971 U | 7/2015 |
| CN | 204463066 U | 7/2015 |
| CN | 104843976 A | 8/2015 |
| CN | 105118391 A | 12/2015 |
| CN | 105511127 A | 4/2016 |
| CN | 205239166 U | 5/2016 |
| CN | 105705330 A | 6/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 102009021938 A1 | 11/2010 |
| DE | 102010007204 A1 | 8/2011 |
| DE | 102013214108 A1 | 2/2015 |
| DE | 102014116798 A1 | 5/2016 |
| EP | 0076924 A2 | 4/1983 |
| EP | 0241355 A1 | 10/1987 |
| EP | 0316224 A1 | 5/1989 |
| EP | 0347049 A2 | 12/1989 |
| EP | 0418700 A1 | 3/1991 |
| EP | 0423698 A1 | 4/1991 |
| EP | 0525970 A1 | 2/1993 |
| EP | 0664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1647663 A1 | 4/2006 |
| EP | 2236281 A1 | 10/2010 |
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3288791 A1 | 3/2018 |
| EP | 3315467 A2 | 5/2018 |
| EP | 3426614 A1 | 1/2019 |
| EP | 3532442 A1 | 9/2019 |
| FR | 2750075 A1 | 12/1997 |
| FR | 2918411 A1 | 1/2009 |
| FR | 3012073 A1 | 4/2015 |
| GB | 0805770 A | 12/1958 |
| GB | 0991867 A | 5/1965 |
| GB | 1319846 A | 6/1973 |
| GB | 2011316 A | 7/1979 |
| GB | 2281542 A | 3/1995 |
| JP | 55-154329 | 12/1980 |
| JP | 57-048082 | 3/1982 |
| JP | 58-073681 A | 5/1983 |
| JP | 58-194751 | 11/1983 |
| JP | 59-076561 A | 5/1984 |
| JP | 63-089317 A | 4/1988 |
| JP | 63-190730 | 8/1988 |
| JP | 03-059337 U | 6/1991 |
| JP | 03-228840 A | 10/1991 |
| JP | 04-119931 | 4/1992 |
| JP | 05-116972 A | 5/1993 |
| JP | 06-340029 A | 12/1994 |
| JP | 10-218630 A | 8/1998 |

(56) References Cited

FOREIGN PATENT DOCUMENTS

| | | |
|---|---|---|
| JP | 11-001349 A | 1/1999 |
| JP | 11-006029 A | 1/1999 |
| JP | 11-060293 A | 3/1999 |
| JP | 2000-260330 A | 9/2000 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |
| JP | 2006-313222 A | 11/2006 |
| JP | 2007-188035 A | 7/2007 |
| JP | 2007-197288 A | 8/2007 |
| JP | 2010-145731 A | 7/2010 |
| JP | 2012-111661 A | 6/2012 |
| JP | 2013-084269 A | 5/2013 |
| JP | 2013-099821 A | 5/2013 |
| JP | 2014-126564 A | 7/2014 |
| JP | 2015-502901 A | 1/2015 |
| JP | 2015-092422 A | 5/2015 |
| JP | 5748082 B2 | 7/2015 |
| JP | 5796561 B2 | 10/2015 |
| JP | 2016-500458 A | 1/2016 |
| JP | 2016-031696 A | 3/2016 |
| JP | 2016-517380 A | 6/2016 |
| JP | 2016-130810 A | 7/2016 |
| JP | 2016-144008 A | 8/2016 |
| JP | 5976561 B2 | 8/2016 |
| JP | 2016-173794 A | 9/2016 |
| JP | 2016-530204 A | 9/2016 |
| JP | 2016-203609 A | 12/2016 |
| JP | 2016-207200 A | 12/2016 |
| JP | 2017-026694 A | 2/2017 |
| JP | 6281825 B2 | 2/2018 |
| JP | 6340029 B2 | 6/2018 |
| KR | 2002-0019045 A | 3/2002 |
| KR | 10-0479282 B1 | 8/2005 |
| KR | 10-2008-0023888 A | 3/2008 |
| KR | 10-2013-0005776 | 1/2013 |
| KR | 10-2014-0111403 | 9/2014 |
| KR | 10-2015-0026911 | 3/2015 |
| KR | 10-2015-0033969 | 4/2015 |
| KR | 10-2015-0051458 | 5/2015 |
| KR | 10-1550833 | 9/2015 |
| KR | 10-2015-0121101 | 10/2015 |
| KR | 10-2016-0118746 | 10/2016 |
| KR | 10-1674060 | 11/2016 |
| KR | 10-2016-0144008 | 12/2016 |
| KR | 10-2017-0000208 | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201017499 A | 5/2010 |
| TW | 201438895 A | 10/2014 |
| TW | 201546006 A | 12/2015 |
| TW | 201617808 A | 5/2016 |
| TW | 201636309 A | 10/2016 |
| TW | 201637857 A | 11/2016 |
| VN | 58334 | 7/2018 |
| WO | 94/25272 A1 | 11/1994 |
| WO | 97/39074 A1 | 10/1997 |
| WO | 98/01649 A1 | 1/1998 |
| WO | 00/73062 A1 | 12/2000 |
| WO | 2004/087590 A2 | 10/2004 |
| WO | 2006/095005 A1 | 9/2006 |
| WO | 2007/108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/115403 A2 | 9/2011 |
| WO | 2011/144359 A1 | 11/2011 |
| WO | 2011/155403 A1 | 12/2011 |
| WO | 2012/005307 A1 | 1/2012 |
| WO | 2012/058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/045809 A1 | 3/2014 |
| WO | 2014/085663 A1 | 6/2014 |
| WO | 2014/107640 A1 | 7/2014 |
| WO | 2014/118293 A1 | 8/2014 |
| WO | 2014/172237 A2 | 10/2014 |
| WO | 2014/175371 A1 | 10/2014 |
| WO | 2015/031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016/027812 A1 | 2/2016 |
| WO | 2016/028580 A1 | 2/2016 |
| WO | 2016/044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/196531 A1 | 12/2016 |
| WO | 2016/196546 A1 | 12/2016 |
| WO | 2016/202605 A1 | 12/2016 |
| WO | 2016/208967 A2 | 12/2016 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/146866 A1 | 8/2017 |
| WO | 2017/155932 A1 | 9/2017 |
| WO | 2017/158031 A1 | 9/2017 |
| WO | 2018/005646 A1 | 1/2018 |
| WO | 2018/009504 A1 | 1/2018 |
| WO | 2018/015392 A1 | 1/2018 |
| WO | 2018/075853 A1 | 4/2018 |
| WO | 2018/081068 A1 | 5/2018 |
| WO | 2018/102332 A1 | 6/2018 |
| WO | 2018/125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

"Product Information Sheet", Corning® Gorilla® Glass 3 with Native Damage Resistance ™, Corning Incorporated, Rev: F_090315, 2015, 2 pages.

"Stainless Steel—Grade 410 (Uns S41000)", available online at <https://www.azom.com/article.aspx?ArticleID=970>, Oct. 23, 2001, 5 pages.

"Standard Test Method for Measurement of Glass Stress—Optical Coefficient", ASTM International, Designation: C770-16, 2016.

(56) References Cited

OTHER PUBLICATIONS

"Stiles Custom Metal, Inc"., Installation Recommendations, Retrieved from: https://stilesdoors.com/techdata/pdf/Installation%20Recommendations%20HM%20Windows,%20Transoms%20&%>OSidelites%200710.pdf), 2010, 3 Pages.
Ashley Klamer, "Dead front overlays", Marking Systems, Inc., Jul. 8, 2013, 2 pages.
ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
ASTM C1422/C1422M-10 "Standard Specification for Chemically Strengthened Flat Glass"; Downloaded Jan. 24, 2018; 5 pages.
ASTM Standard C770-98 (2013), "Standard Test Method for Measurement of Glass Stress-Optical Coefficient", 2013, 8 pages.
Author Unknown; "Stress Optics Laboratory Practice Guide" 2012; 11 Pages.
Baillon et al: "An Improved Method for Manufacturing Accurate and Cheap Glass Parabolic Mirrors", Nuclear Instruments & Methods in Physics Research. Section A, Elsevier BV * North-Holland, NL, vol. A276, No. 3, 1988, 13 pages, XP000051982.
Belis et al; "Cold Bending of Laminated Glass Panels"; Heron vol. 52 (2007) No. 1/2; 24 Pages.
Burchardt et al., (Editorial Team), Elastic Bonding: The basic principles of adhesive technology and a guide to its cost-effective use in industry, 2006, 71 pages.
Byun et al; "A Novel Route for Thinning of LCD Glass Substrates"; SID 06 Digest; pp. 1786-1788, v37, 2006.
Datsiou et al., "Behaviour of cold bent glass plates during the shaping process", Engineered Transparency. International Conference atglasstec, Dusseldorf, Germany, Oct. 21 and 22, 2014, 9 pages.
Doyle et al; "Manual On Experimental Stress Analysis"; Fifth Edition, Society for Experimental Mechanics, 1989, 31 Pages.
Elziere; "Laminated Glass: Dynamic Rupture of Adhesion"; Polymers; Universite Pierre Et Marie Curie—Paris VI, 2016. English; 181 Pages.
Engineering ToolBox, "Coefficients of Linear Thermal Expansion", available online at <https://www.engineeringtoolbox.com/linear-expansion-coefficients-d_95.html>, 2003, 9 pages.
Fauercia "Intuitive HMI for a Smart Life On Board" (2018); 8 Pages http://www.faurecia.com/en/innovation/smart-life-board/intuitive-HMI.
Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles[retrieved on Nov. 23, 2017], 4 Pages.
Ferwerda et al., "Perception of sparkle in anti-glare display screens", Journal of the SID, vol. 22, Issue 2, 2014, pp. 129-136.
Fildhuth et al; "Considerations Using Curved, Heat or Cold Bent Glass for Assembling Full Glass Shells", Engineered Transparency, International Conference At Glasstec, Dusseldorf, Germany, Oct. 25 and 26, 2012; 11 Pages.
Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.
Fildhuth et al; "Layout Strategies and Optimisation of Joint Patterns in Full Glass Shells", Challenging Glass 3—Conference On Architectural and Structural Applications of Glass, Bos, Louter, Nijsse, Veer (Eds.), Tu Delft, Jun. 2012; 13 Pages.
Fildhuth et al; "Recovery Behaviour of Laminated Cold Bent Glass—Numerical Analysis and Testing"; Challenging Glass 4 & Cost Action TU0905 Final Conference—Louter, Bos & Beus (Eds) (2014); 9 Pages.
Fildhuth; "Design and Monitoring of Cold Bent Lamination—Stabilised Glass"; ITKE 39 (2015) 270 Pages.
Galuppi et al; "Buckling Phenomena In Double Curved Cold-Bent Glass;" Intl. Journal of Non-Linear Mechanics, vol. 64, 2014, pp. 70-84.
Galuppi et al; "Cold-Lamination-Bending Of Glass: Sinusoidal Is Better Than Circular", Composites Part B, 79, 2015, pp. 285-300.
Galuppi et al; "Large Deformations And Snap-Through Instability Of Cold-Bent Glass"; Challenging Glass 4 & Cost Action TU0905 Final Conference, 2014, pp. 681-689.
Galuppi et al; "Optical Cold Bending Of Laminated Glass"; International Journal Of Solids And Structures, vol. 67-68, 2015, pp. 231-243.
Galuppi L et al: "Optimal cold bending of laminated glass", Jan. 1, 2007 vol. 52, No. 1/2 Jan. 1, 2007 (Jan. 1, 2007), pp. 123-146.
Gollier et al., "Display Sparkle Measurement and Human Response", SID Symposium Digest of Technical Papers, vol. 44, Issue 1, 2013, pp. 295-297.
Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).
Li et al., "Effective Surface Treatment on the Cover Glass for Autointerior Applications", SID Symposium Digest of Technical Papers, vol. 47, 2016, pp. 467-469.
Millard; "Bending Glass In The Parametric Age", Retrieved from: http://www.enclos.com/site-info/news/bending-glass-in-the-parametric-age, ENCLOS, 2015, pp. 1-6.
Neugebauer et al; "Let Thin Glass In The Faade Move Thin Glass—New Possibilities For Glass In The Faade", Conference Paper, Jun. 2018, 12 Pages.
Pambianchi et al; "Corning Incorporated: Designing A New Future With Glass And Optics"; Chapter 1 In "Materials Research For Manufacturing: An Industrial Perspective Of Turning Materials Into New Products"; Springer Series Material Science, Issue 224, 2016, p. 12.
Pegatron Corp. "Pegaton Navigate The Future"; Ecockpit/Center Console Work Premiere; Automotive Worlds, Downloaded on Jul. 12, 2017, 2 Pages.
Photodon, "Screen Protectors For Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).
Scholze, H., "Glass-Water Interactions", Journal of Non-Crystalline Solids vol. 102, Issues 1-3, Jun. 1, 1988, pp. 1-10.
Stattler, "New Wave-Curved Glass Shapes Design", Glass Magazine, 2013; 2 Pages.
Stiles Custom Metal, Inc., Installation Recommendations, 2010 (https://stilesdoors.com/techdata/pdf/Installation%20Recommendations%20HM%20Windows,%20Transoms%20&%20Sidelites%200710.pdf) (Year: 2010).
Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.
Vakar et al; "Cold Bendable, Laminated Glass—New Possibilities In Design"; Structural Engineering International, vol. 2, 2004, pp. 95-97.
Wang, "Polydimethylsiloxane mechanical properties measured by macroscopic compression and nanoindentation techniques", Graduate Theses and Dissertations, University of South Florida, 2011, 79 pages.
Weijde; "Graduation Plan", Jan. 2017; 30 Pages.
Werner; "Display Materials And Processes," Information Display; May 2015; 8 Pages.
Chinese Patent Application No. 202211178265.1, Office Action dated May 23, 2025, 4 pages (English Translation only), Chinese Patent Office.

* cited by examiner

LAMINATING THIN STRENGTHENED GLASS TO CURVED MOLDED PLASTIC SURFACE FOR DECORATIVE AND DISPLAY COVER APPLICATION

CROSS-REFERENCE TO RELATED APPLICATIONS

This application is a continuation application and claims the benefit of priority under 35 U.S.C. § 120 of U.S. application Ser. No. 17/580,085 filed Jan. 20, 2022, which in turn, claims the benefit of priority of U.S. application Ser. No. 17/007,757 filed Aug. 31, 2020, now patent Ser. No. 11/331,886, granted May 17, 2022, which in turn, claims the benefit of priority under 35 U.S.C. § 120 of U.S. patent application Ser. No. 16/312,797 filed Dec. 21, 2018, now patent Ser. No. 11/338,556, granted May 24, 2022, which claims the benefit of priority under 35 U.S.C. § 371 of International Patent Application Serial No. PCT/US2017/039752, filed on Jun. 28, 2017 which in turn, claims the benefit of priority under 35 U.S.C. § 119 of U.S. Provisional Application Ser. No. 62/444,470 filed on Jan. 10, 2017 and U.S. Provisional Application Ser. No. 62/355,542 filed on Jun. 28, 2016, the contents of which are relied upon and incorporated herein by reference in their entirety.

BACKGROUND

The present disclosure relates to curved cold-formed glass substrates, articles including such glass substrates, and related processes.

Curved glass substrates are desirable in many contexts. One such context is for use as a cover glass for a curved display, which may be incorporated into an appliance, an architectural element (e.g., wall, window, modular furniture, shower door, mirrors etc.), a vehicle (e.g., automobiles, aircraft, sea craft and the like). Existing methods of forming such curved glass substrates, such as thermal forming, have drawbacks including optical distortion and surface marking. Accordingly, there is a need for curved glass substrates that do not exhibit the optical distortion and surface marking typically found in thermally-formed curved glass substrates.

BRIEF SUMMARY

The present disclosure is directed to articles comprising cold-formed glass substrates bonded to a non-planar rigid support structure, and methods of making such articles.

In some embodiments, a process comprises cold-forming a flat glass substrate into a non-planar shape using a die. In one or more embodiments, the cold-formed glass substrate is bonded to a non-planar rigid support structure at a plurality of non-planar points using the die.

In some embodiments, a process comprises cold-forming a flat glass substrate into a non-planar shape using an injection-molding die. In some embodiments, bonding is accomplished by injection molding the non-planar rigid support structure onto the cold-formed glass substrate while the die holds the cold-formed glass substrate in the non-planar shape.

In some embodiments, the process further comprises, after bonding, applying an adhesive to an edge of an interface between the cold-formed glass substrate and the non-planar rigid support structure.

In some embodiments, a process comprises cold-forming a glass substrate into a non-planar shape. In some embodiments, bonding is accomplished by using the die to directly bond the cold-formed glass substrate onto a non-planar rigid support structure. In one or more embodiments, the non-planar rigid support structure is formed prior to the bonding.

In some embodiments, the non-planar rigid support structure is placed into a recess in the die prior to bonding.

In some embodiments, the process further comprises applying a coating or surface treatment to a surface of the flat glass substrate prior to cold-forming. The coating may be an ink coating, an antireflective coating, an antiglare coating and/or any other suitable coating. The surface treatment may include an antiglare surface, a haptic surface that provides tactile feedback, and the like.

In some embodiments, the cold-formed glass substrate, after bonding to the non-planar rigid support structure, includes an open region not in direct contact with the non-planar rigid support structure, the open region having a curved shape maintained by the non-planar rigid support structure. A display may be attached to at least one of the cold-formed glass substrate and the non-planar rigid support structure, such that the display is visible through the open region of the cold-formed glass substrate.

In some embodiments, during and after cold-forming, the temperature of the glass substrate does not exceed 800° F.

In some embodiments, the flat glass substrate comprises a strengthened glass. The strengthened glass may include a chemically strengthened glass, a thermally strengthened glass, a mechanically strengthened glass or a glass that has been strengthened using any one or more of chemical strengthening, thermal strengthening and mechanical strengthening.

In some embodiments, the cold-formed glass substrate has opposing major surfaces, and the non-planar rigid support structure is bonded to only one of the major surfaces.

In some embodiments, an article is formed by any of the processes described herein.

In some embodiments, an article comprises a cold-formed glass substrate having opposing major surfaces and a curved shape, the opposing major surfaces comprising a surface stress that differ from one another. In one or more embodiments, the cold-formed glass substrate is attached to a rigid support structure having the curved shape. In one or more embodiments, the cold-formed glass substrate includes an open region not in direct contact with the non-planar rigid support structure, and the open region has a curved shape maintained by the non-planar rigid support structure.

In some embodiments, an article comprises a non-planar rigid support structure having a developable surface. A cold-formed glass substrate is bonded to the non-planar rigid support structure. The cold formed glass substrate has the developable surface.

In some embodiments, a display is attached to at least one of the cold-formed glass substrate and the non-planar rigid support structure. The display is visible through the open region of the cold-formed glass substrate. In one or more embodiments, the cold-formed glass substrate may be free of open regions (i.e., the glass substrate may be a continuous sheet) and the display may be visible through the cold-formed glass substrate.

In some embodiments, the cold-formed glass substrate comprises any one or both a coating and a surface treatment on a major surface thereof. The coating may be an ink coating, an antireflective coating, an antiglare coating and/or any other suitable coating. The surface treatment may include an antiglare surface, a haptic surface that provides tactile feedback, and the like.

In some embodiments, the cold-formed glass substrate is a strengthened glass substrate. The strengthened glass may include a chemically strengthened glass, a thermally strengthened glass, a mechanically strengthened glass or a glass that has been strengthened using any one or more of chemical strengthening, thermal strengthening and mechanical strengthening.

In some embodiments, the non-planar rigid support structure is bonded to only one of the major surfaces.

In some embodiments, the cold formed glass substrate has a developable surface.

The embodiments of the preceding paragraphs may be combined in any permutation.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
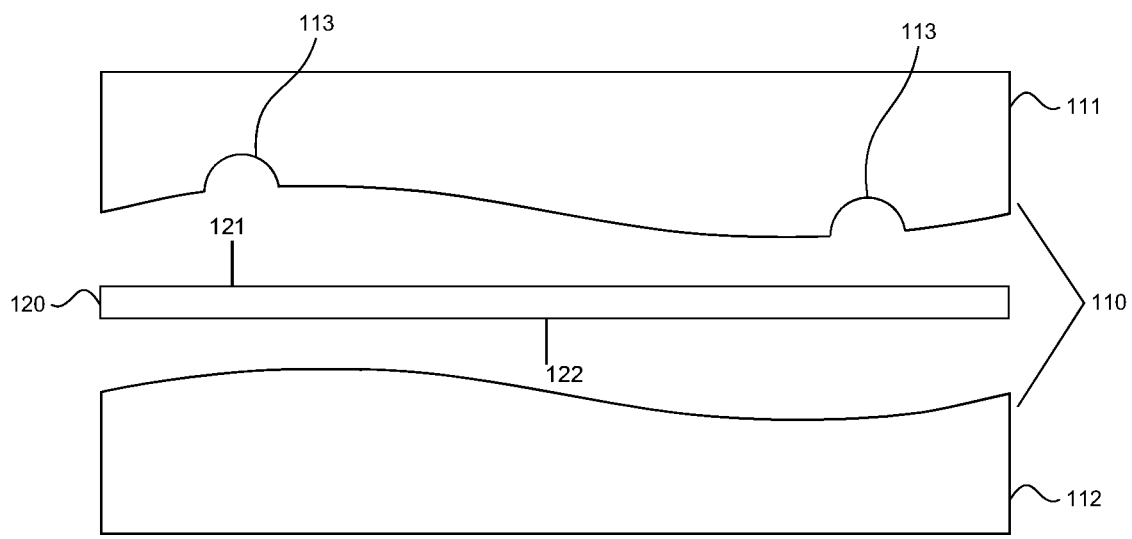
FIG. 1 illustrates an injection mold die designed with a specific desired curved shape, and a flat glass substrate.

Vehicle manufactures are creating interiors that better connect, protect and safely inform today's drivers and passengers. As the industry moves towards autonomous driving, there is a need for creating large format appealing displays. There is already a trend towards larger displays including touch functionality in the new models from several OEMs. Such trends are also immerging in appliances, architectural elements (e.g., wall, window, modular furniture, shower door, mirrors etc.), and other vehicles (e.g., aircraft, seacraft and the like). However, most of these displays consist of two dimensional plastic cover lens.

Due to these emerging trends in the automotive interior industry and related industries, there is a need to develop a low cost technology to make three-dimensional transparent surfaces. Strengthened glass materials, such as chemically strengthened, thermally strengthened and/or mechanically strengthened glass materials are particularly desirable for use as such surfaces, particularly where the glass substrate is used as a curved cover glass for a display.

However, many methods for forming curved glass surfaces involve subjecting glass substrates to thermal forming processes (including thermal forming processes that include heating a glass substrate to a temperature above the transition temperature of the glass). Such processes can be energy intensive due to the high temperatures involved and such processes add significant cost to the product. Furthermore, thermal forming processes may cause strength degradation or may damage any coatings present on the glass substrate, such as antireflective (AR) coatings or ink coatings. Moreover, thermal forming processes may impart undesirable characteristics onto the glass itself, such as distortion and marking.

A planar glass substrate may be "cold-formed" to have a curved or three-dimensional shape. As used herein, "cold-forming" refers to bending the glass substrate at temperatures below the glass transition temperature of the glass. In some embodiments, cold-forming occurs at temperatures below 800° F. A cold-formed glass substrate has opposing major surfaces and a curved shape. The opposing major surfaces exhibit a surface stress that differs from one another that are created during cold-forming. The stresses include surface compressive stresses generated by the cold-forming process. These stresses are not thermally relaxed because the glass substrate is maintained at temperatures well below the glass transition temperature.

In some embodiments, a cold-formed glass substrate forms a "developable" surface. A developable surface has a surface with zero Gaussian curvature. In one or more embodiments, the developable surface means that all points of the cold-formed glass substrate surface have a Gaussian curvature (GC) that is equal to zero (wherein GC is equal to Kmax*Kmin, wherein Kmax and Kmin are principal curvatures defined as Kmax=1/R' and Kmin=1/R"), and wherein one of Kmax and Kmin is non-zero. R' is the maximum radius of curvature and R" is the minimum radius of curvature. In one or more embodiments, the surface of the cold-formed glass substrate that can be flattened into a plane without stretching or compressing within the plane of the surface.

Examples of developable surfaces include cones, cylinders, oloids, tangent developable surfaces, and portions thereof. A surface that projects onto a single curved line is a developable surface.

In some embodiments, the article may include a glass substrate that is provided as a sheet and that is strengthened (prior to being shaped into some embodiments of the article described herein). For example, the glass substrate may be strengthened by any one or more of thermal strengthening, chemical strengthening, mechanical strengthening or by a combination thereof. In some embodiments, strengthened glass substrate have a compressive stress (CS) layer extending from a surface of the substrate thereof to a compressive stress depth (or depth of compressive stress layer or DOL). The depth of compression is the depth at which compressive stress switches to tensile stress. The region within the glass substrate exhibiting a tensile stress is often referred to as a central tension or CT layer.

As used herein, "thermally strengthened" refers to glass substrates that are heat treated to improve the strength of the substrate. In thermally-strengthened glass substrates, the CS layer is formed by heating the substrate to an elevated temperature above the glass transition temperature (i.e., near or approaching the glass softening point), and then cooling the glass surface regions more rapidly than the inner regions of the glass. The differential cooling rates between the surface regions and the inner regions generates a residual CS layer at the surfaces.

Factors that impact the degree of surface compression generated by thermal strengthening processes include the air-quench temperature, volume, and other variables that create a surface compression of at least 10,000 pounds per square inch (psi). In chemically strengthened glass substrates, the replacement of smaller ions by larger ions at a temperature below that at which the glass network can relax produces a distribution of ions across the surface of the glass that results in a stress profile. The larger volume of the incoming ion produces the CS layer extending from a surface and the CT layer in the center of the glass. Chemical strengthening may be achieved by an ion exchange process which includes immersion of a glass substrate into a molten salt bath for a predetermined period of time to allow ions at or near the surface(s) of the glass substrate to be exchanged for larger metal ions from the salt bath. In some embodiments, the temperature of the molten salt bath is from about 375° C. to about 450° C. and the predetermined time period is in the range from about four to about eight hours. In one example, sodium ions in a glass substrate are replaced by potassium ions from the molten bath, such as a potassium nitrate salt bath, though other alkali metal ions having larger atomic radii, such as rubidium or cesium, can replace smaller alkali metal ions in the glass. In another example, lithium ions in a glass substrate are replaced by potassium and/or sodium ions from the molten bath that may include potassium nitrate, sodium nitrate or a combination thereof, although other alkali metal ions having larger atomic radii, such as rubidium or cesium, can replace smaller alkali metal ions in the glass. In some embodiments, smaller alkali metal ions in the glass substrate can be replaced by Ag+ ions. Similarly, other alkali metal salts such as, but not limited to, sulfates, phosphates, halides, and the like may be used in the ion exchange process. The glass substrate may be immersed in a single bath or in multiple and successive baths which may have the same or different composition and/or temperature from one another. In some embodiments, the immersion in such multiple baths may be for different periods of time from one another.

In mechanically-strengthened glass substrates, the CS layer is generated by a mismatch of the coefficient of thermal expansion between portions of the glass substrate.

In strengthened glass substrates, the DOL is related to the CT value by the following approximate relationship (Equation 1)

$$CT \cong \frac{CS \times DOL}{thickness - 2 \times DOL}$$

where thickness is the total thickness of the strengthened glass substrate and DOL depth of layer (DOL) is the depth of the compressive stress. Unless otherwise specified, central tension CT and compressive stress CS are expressed herein in megapascals (MPa), whereas thickness and depth of layer DOL are expressed in millimeters or microns. Unless otherwise described, the CS value is the value measured at the surface and the CT value is the tensile stress value (as determined by Equation 1).

In some embodiments, a strengthened glass substrate can have a surface CS of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. In some embodiments, the surface CS is the maximum CS in the glass substrate. The strengthened glass substrate may have a DOL of 15 micrometers or greater, 20 micrometers or greater (e.g., 25, 30, 35, 40, 45, 50 micrometers or greater) and/or a maximum CT value of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened glass substrate has one or more of the following: a surface CS greater than 500 MPa, a DOL greater than 15 micrometers, and a maximum CT of greater than 18 MPa.

The CS and DOL may be determined by surface stress meter such as the commercially available FSM-6000 instrument, manufactured by Orihara Industrial, Co., Ltd. (Tokyo, Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method.

The materials for the glass substrates may be varied. The glass substrates used to form the articles described herein can be amorphous or crystalline. In this regard, the use of the term "glass" is general and is intended to encompass more than strictly amorphous materials. Amorphous glass substrates according to some embodiments can be selected from soda lime glass, alkali aluminosilicate glass, alkali containing borosilicate glass and alkali aluminoborosilicate glass. Examples of crystalline glass substrates can include glass-ceramics, sapphire or spinel. Examples of glass-ceramics include $Li_2O$—$Al_2O_3$-$SiO_2$ system (i.e. LAS-System) glass ceramics, MgO—$Al_2O_3$-$SiO_2$ System (i.e. MAS-System) glass ceramics, glass ceramics including crystalline phases of any one or more of mullite, spinel, α-quartz, β-quartz solid solution, petalite, lithium disilicate, β-spodumene, nepheline, and alumina.

Glass substrates may be provided using a variety of different processes. For example, exemplary glass substrate forming methods include float glass processes and down-draw processes such as fusion draw and slot draw. A glass substrate prepared by a float glass process may be characterized by smooth surfaces and uniform thickness is made by floating molten glass on abed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin onto rollers. Once off the bath, the glass substrate can be cooled further and annealed to reduce internal stress.

Down-draw processes produce glass substrate having a uniform thickness that possess relatively pristine surfaces. Because the average flexural strength of the glass substrate is controlled by the amount and size of surface flaws, a pristine surface that has had minimal contact has a higher initial strength. Down-drawn glass substrate may be drawn into a sheet having a thickness of less than about 2 millimeters. In addition, down drawn glass substrate have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing sheet of glass. The fusion draw method offers the advantage that, because the two glass films flowing over the channel fuse together, neither of the outside surfaces of the resulting sheet of glass comes in contact with any part of the apparatus. Thus, the surface properties of the fusion drawn sheet of glass are not affected by such contact.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous sheet and into an annealing region.

Exemplary compositions for use in the glass substrate will now be described. One example glass composition comprises $SiO_2$, $B_2O_3$ and $Na_2O$, where $(SiO_2+B_2O_3) \geq 66$ mol. %, and $Na_2O \geq 9$ mol. %. Suitable glass compositions, in some embodiments, further comprise at least one of $K_2O$, MgO, and CaO. In some embodiments, the glass compositions can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO. A further example glass composition comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In some embodiments, an alkali aluminosilicate glass composition comprises alumina, at least one alkali metal and, in some embodiments, greater than 50 mol. % $SiO_2$, in some embodiments at least 58 mol. % $SiO_2$, and in some embodiments at least 60 mol. % $SiO_2$, wherein the ratio $((Al_2O_3+B_2O_3)/\Sigma \text{ modifiers}) \geq 1$, where in the ratio the components are expressed in mol. % and the modifiers are alkali metal oxides. This glass composition, in some embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma \text{modifiers}) > 1$.

In some embodiments, the glass substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % □ $SiO_2+B_2O_3+CaO$ □ 69 mol. %; $Na_2O+K_2O+B_2O_3+MgO+CaO+SrO > 10$ mol. %; 5 mol. % □ $MgO+CaO+SrO$ □ 8 mol. %; $(Na_2O+B_2O_3)$ □ $Al_2O_3$ □ 2 mol. %; 2 mol. % □ $Na_2O$ □ $Al_2O_3$ □ 6 mol. %; and 4 mol. % □ $(Na_2O+K_2O)$ □ $Al_2O_3$ □ 10 mol. %.

In some embodiments, the glass substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

In some embodiments, the compositions used for a glass substrate may be batched with 0-2 mol. % of at least one fining agent selected from a group that includes $Na_2SO_4$, NaCl, NaF, NaBr, $K_2SO_4$, KCl, KF, KBr, and $SnO_2$.

The articles may be a single sheet of glass or a laminate. According to some embodiments, a laminate refers to opposing glass substrates, such as the glass substrates described herein. In some embodiments, the glass substrates may be separated by an interlayer, for example, poly(vinyl butyral) (PVB), ethylene-vinyl acetate (EVA), polyvinyl chloride (PVC), ionomers, and thermoplastic polyurethane (TPU). A glass substrate forming part of a laminate can be strengthened (chemically, thermally, and/or mechanically) as described above. Thus, laminates according to some embodiments comprise at least two glass substrates bonded together by an interlayer in which a first glass substrate defines a first ply and a second glass substrate defines a second ply. The second ply may face the user of a display (i.e., the interior of a vehicle, the user facing panel of an appliance or the user facing surface of an architectural element), while the first play may face the opposite direction. In vehicle applications such as automotive glazings, the first ply is exposed to a vehicle or automobile interior and the second ply faces an outside environment of the automobile. In some embodiments, the user interface may be from the interior, from the exterior or from both the interior and the exterior of the laminate, when used in automotive glazings. In vehicle applications such as automotive interiors, the second ply is unexposed and placed on an underlying support (e.g., a display, dashboard, center console, instrument panel, seat back, seat front, floor board, door panel, pillar, arm rest etc.), and the first ply is exposed to the vehicle or automobile interior and thus the user. In architectural applications, the second ply is exposed to a building, room, or furniture interior and the first ply faces an outside environment of the building, room or furniture.

Although various specific glasses are described herein, in some embodiments, any cold-formable glass may be used.

Some embodiments of the articles disclosed herein are useful in automobile interiors because such articles provide a curved cover compatible with curved displays. To be compatible with a curved display, a cover should match the shape of the curved display closely to insure optimal fit and enable a high quality viewing. It is also desirable to provide a cover that is high optical quality and cost effective. Thermal forming a cover to the precise shape presents challenges in attaining that desired shape. In addition, when glass is used, it is a challenge to minimize the downside effects of heating the cover to its softening point (e.g., distortion, and marking). The concept of cold-forming addresses these issues and permits the use of glass but creates new challenges in providing a sufficient support to maintain the cold-form shape and provide rigidity. The ability to cold-form a thin glass substrate to the prescribed shape presents the opportunity for a high quality, cost effective solution.

Moreover, the articles described herein are also compatible with coatings and surface treatments that are often desirable. Examples of such coatings include anti-reflective (AR), antiglare (AG) and decorative and/or functional coatings. Examples of such surface treatments include AG surfaces, a haptic surface that provides tactile feedback, and the like. AR and AG coatings and AG surfaces may improve display visibility in a variety of challenging ambient lighting conditions. High-quality multi-layer AR coating processes are typically applied utilizing vapor deposition or sputter coating techniques. These techniques are usually limited to deposition on flat surfaces due to the nature of the process. Providing these coatings on a curved three dimensional surface is challenging and further adds to the cost of the process. Decorative ink coatings can be applied to a variety of shaped/curved surfaces, however the process to apply these coating to flat surfaces are simpler, better established, and more cost effective. Further, surface treatments (typically formed by etching treatments) are also typically applied to flat surfaces.

In one or more embodiments, the article includes a cold-formed glass substrate with a non-planar shape and a first major surface and an opposing second major surface and a non-planar rigid support structure bonded to the first major surface at one or more non-planar points. In some embodiments, the non-planar rigid support structure is bonded to the first major surface at a plurality of non-planar points.

Figure 4:
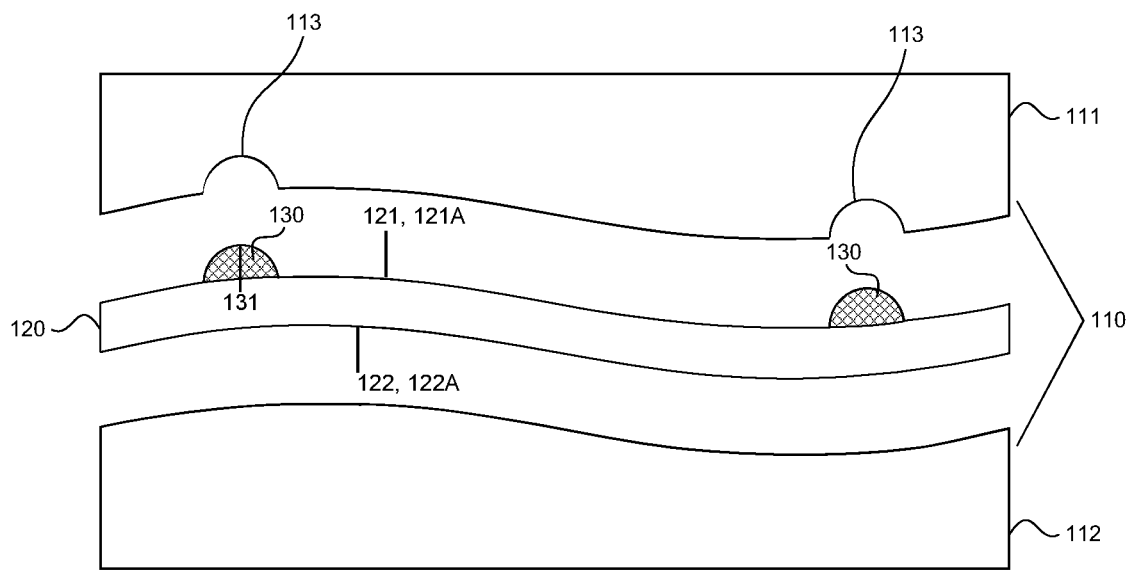
FIG. 4 illustrates the die of FIG. 3 and the resultant article after the die retracts. The resultant article is a cold-formed glass substrate bonded to a non-planar rigid support structure. The cold-formed cover glass substrate retains design curvature because of the rigidity of the structural backside support molded onto the back side of the cold-formed cover glass substrate.
Figure 5:
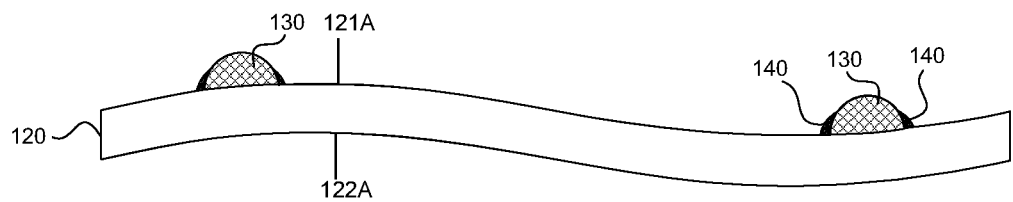
FIG. 5 shows the cold-formed glass substrate bonded to a non-planar rigid support structure of FIG. 4, with additional adhesive.

In some embodiments, the glass substrate is cold-formed and exhibits a surface compressive stress on the first and second major surfaces that differ from one another at, near or adjacent the one or more non-planar points. As illustrated in FIG. 4, first and second major surfaces 121 and 122 are in tension or compression depending on the direction of curvature. First major surface 121 at a first position 121A adjacent the non-planar rigid support structure 130 is in tension, while second major surface 122 at a second position 122A adjacent the same non-planar rigid support structure 130 is in compression. Accordingly, the second major surface 122 at the second position 122A exhibits a greater surface compressive stress than first major surface 121 at a first position 121A. This is asymmetrical surface compressive stress is exhibited even when the glass substrate 120 is strengthened as described herein and exhibits a surface compressive stress prior to being cold-formed. In one or more embodiments, first position 121A and the second position 122A of the respective first and second major surfaces 121, 122 are adjacent the same non-planar rigid support such that either one or both the first position and the second positions is located at a distance of 5 centimeters or less from the non-planar rigid support structure 130. In one or more embodiments, either one or both the first position and the second position are located at a distance of 4 centimeters or less, 3 centimeters or less, 3 centimeters or less, 2 centimeters or less, 1 centimeter or less or 0.5 centimeter or less from the non-planar rigid support structure 130. The distances of the first and second positions relative to the non-planar rigid support structure 130 are measured from the center 131 of the non-planar rigid support structure 130 to the respective first and second positions. In some embodiments, the first position 121A and the second position 122A are located directly opposite from one another and exhibit the asymmetric surface compressive stress described herein, as illustrated in FIG. 5

In one or more embodiments, the non-planar rigid support structure is injection molded onto the cold-formed glass substrate while the cold-formed glass comprises the non-planar shape. In some embodiments, either one or both the first major surface and the second major surface of the glass substrate may include a coating or surface treatment (e.g., the coating may include an ink coating and/or an antireflective coating, the surface treatment may include an antiglare treatment). In some instances, the article may include an edge adhesive applied to an edge of an interface between the cold-formed glass substrate and the non-planar rigid support structure. The edge interface may be between one or more minor surface(s) of the cold-formed glass substrate and the non-planar rigid support structure. The minor surface(s) of the cold-formed glass substrate is orthogonal to the first and second major surfaces. In one or more embodiments, the edge interface may be substantially free of an adhesive or other material such that one or more minor surfaces are exposed.

In some instances, the glass substrate includes an open region not in direct contact with the non-planar rigid support structure, and the open region has a curved shape maintained by the non-planar rigid support structure. In some instances, the article includes a display disposed on at least one of the glass substrate and the non-planar rigid support structure, wherein the display is visible through the cold-formed glass substrate. In some instances, the display may be attached to at least one of the glass substrate and the non-planar rigid support structure.

In one or more embodiments, the article includes a glass substrate having opposing major surfaces and a curved shape that is attached to a rigid support structure having the curved shape, wherein the glass substrate includes an open region not in direct contact with the non-planar rigid support structure, and the open region has a curved shape maintained by the non-planar rigid support structure. In such embodiments, the glass substrate exhibits a surface compressive stress on the first and second major surfaces that differ from one another as described herein. In one or more embodiments, the article may include a display that is attached to at least one of the cold formed glass substrate and the non-planar rigid support structure, wherein the display is visible through the open region of the glass substrate. In some embodiments, the glass substrate comprises a coating disposed on either one or both the first major surface or the second major surface. The coating may include an ink or an anti-reflective coating. The glass substrate may be strengthened glass substrate. In some instances, only one of the major surfaces is bonded to the non-planar rigid support.

In some embodiments, a cold-formed glass substrate has a developable surface. A complex developable surface refers to a combination of two or more developable surfaces such as cones, cylinders, oloids, planes and tangent developable surfaces. For instance, a complex developable surface may be a combination of at least a planar and at least a concave surface, or at least a planar and at least a convex surface, or at least a concave and at least a convex surface.

In some embodiments, a complex developable surface may also be formed by a combination of planar, conical, cylindrical, and other developable surfaces and involve both inward and outward bending. In some embodiments, the combination of planar, conical, cylindrical, and other developable surfaces may be in such a way that no sharp edges form while going from one developable surface to another.

In some embodiments, a complex developable surface or a complex developable surface may include one or more planar portions, one or more conical portions, one or more cylindrical portions, and/or one or more other developable surface portions.

In some embodiments, glass substrate is cold-formed into a complex developable surface. A force holding the glass substrate in the complex developable surface is applied and maintained across different portions of the complex developable surface while the cold-formed glass is bonded to a non-planar rigid support structure at a plurality of non-planar points until the bonding is sufficient to maintain the complex developable surface. For example, in the embodiment of FIGS. 1-5, injection mold die 110 may be maintained in the position shown in FIG. 3 until the material of non-planar rigid support structure 130 is sufficiently solidified and bonded to glass substrate 120 to maintain the cold formed shape of glass substrate 120 in the absence injection mold die 110. Similarly, in the embodiment of FIGS. 8-10, direct-bonding die 810 may be maintained in the position shown in FIG. 9 until the adhesive layer 831 is sufficiently cured, and glass substrate 820 is sufficiently bonded to rigid support structure 830 to maintain the cold formed shape of glass substrate 820 in the absence direct bonding die 810.

Figure 9:
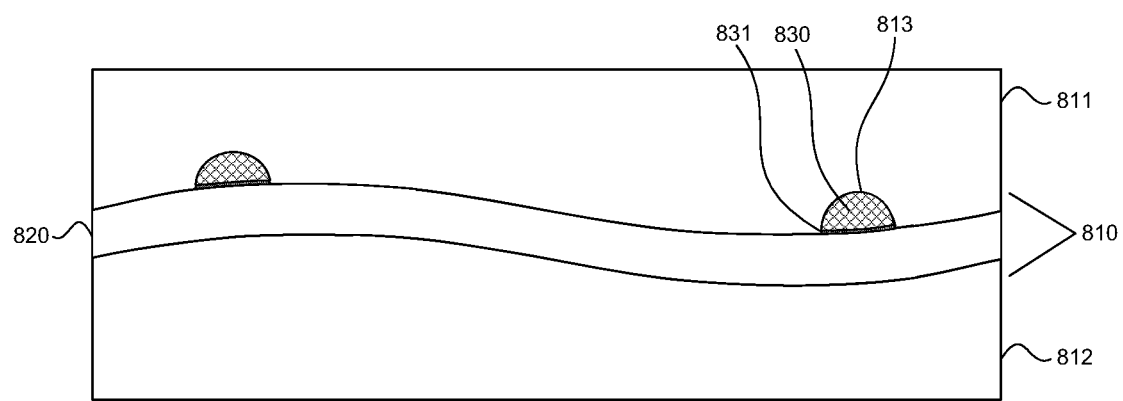
FIG. 9 illustrates the die of FIG. 8 cold-forming the glass substrate into a non-planar shape and bonding the non-planar rigid support structure to the cold-formed glass substrate.

Force may be "maintained" in an area by application of force in spaced or periodic parts of the area. For example, direct bonding die 810 may contact glass substrate 820 everywhere except where rigid support structure 830 is present, as shown in FIG. 9. Or, there may be gaps in such contact, where contact is maintained at enough points to hold glass substrate 820 in place until adhesive layer 830 can cure.

If force is not applied and maintained across different regions of a complex developable surface, complications may arise. For example, if, instead of using a die process or other process that applies and maintains force, a single roller is used, it may be difficult to bond a glass substrate to a rigid support structure having a complex developable surface. At the very least, yield is expected to suffer. Without being bound by theory, internal stress exists in cold-formed glass. In the absence of external constraints, this stress will move the glass towards its initial shape.

Figure 17:
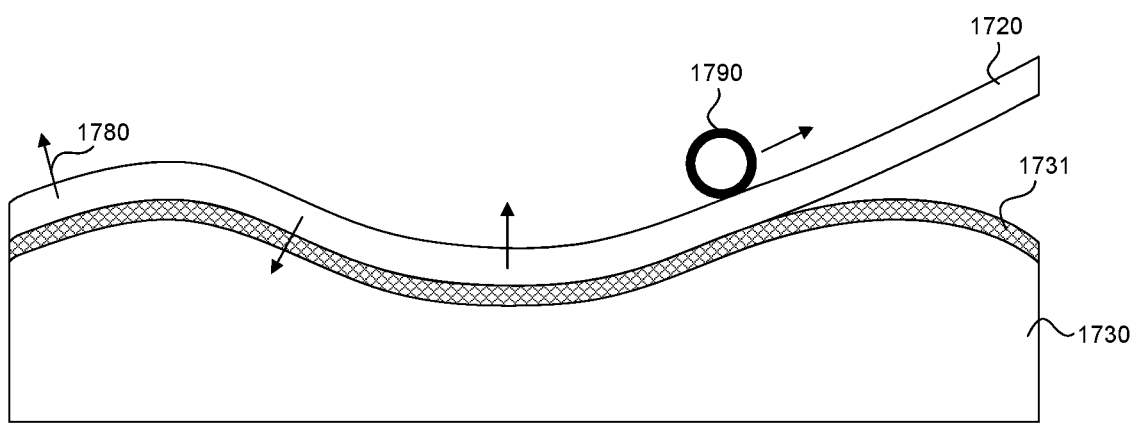
FIG. 17 shows a side view of a glass substrate being applied to a rigid support structure having a developable surface using a single roller.

For example, as shown in FIG. 17, a single roller 1790 is used to press an initially planar glass substrate 1720 against a rigid support structure 1730 having a complex developable surface—three adjacent cylindrical surfaces, where the middle surface has a concavity opposite the outer two. An adhesive layer 1731 is present on rigid support structure 1730. As roller 1790 passes from left to right, stresses in the cold-formed glass substrate 1720 to the left of roller 1790 will tend to return glass substrate 1720 to a planar shape, as illustrated by arrows 1780. These stresses may lead to delamination, or low yield. For simple shapes, this phenomena may not be present (for example in a plane), or may be addressed in other ways (for example, when adhering glass with adhesive to the inside of a cylinder, a slight compressive force across the plane of the glass may push the glass against the adhesive everywhere as the adhesive cures). But, for complex developable surfaces, particularly those with different regions having different concavity, application and maintenance of force is preferred.

This disclosure describes a process to transform a flat glass substrate (such as the glass substrates described herein), which include the above-described coatings or surface treatments, into a cold-formed and curved article supported sufficiently to provide an accurate shape to match a curved display. In some embodiments, a die is used to impart a desired shape to a glass substrate by cold-forming the glass substrate into the desired shape. The die is also used to bond a non-planar rigid support structure to the cold-formed substrate while the die is imparting the desired shape. Once the non-planar rigid support structure is bonded to the cold-formed glass substrate, the die may be removed, and the non-planar rigid support structure maintains the desired shape of the cold-formed glass substrate. A die may be reused many times to reproducibly and precisely create the same shape for multiple articles comprising a non-planar rigid support structure bonded to a cold-formed glass substrate.

In some embodiments, an injection molding process is used to transform the flat glass substrate described hereinto cold-formed and curved article created by injection molding a support structure on a major surface of the glass substrate, thus providing a superior support structure to hold the glass substrate to the prescribed shape and having the flexibility to match the curved display.

In some embodiments, a direct bonding process is used to cold-form and bond a previously flat glass substrate to a curved support structure, using that curved support structure to provide rigidity to the glass substrate and to hold the glass substrate into a cold-form shape of the curved support structure.

Either injection molding or direct bonding could provide support over a significant portion of the major surface of the glass substrate to support and maintain the cold-form shape, while minimizing the stresses imparted on the glass substrate.

This disclosure also describes an article that is a cold-formed glass substrate that is supported by a support structure to maintain a curved shape and minimize the stresses, and is open (unsupported) for the display area allowing the glass substrate surface to conform to the display shape.

The methods described herein and the resulting articles exhibit high quality and enable the integration of optical and other features.

With respect to high quality, the articles described herein enable superior fit to curved displays and exhibit high optical quality. Thin glass substrates may possess a flexible characteristic able to accommodate the curved display.

Cold-forming maintains the high quality of the flat glass substrate that could be diminished in a thermal forming process. This concept also allows excellent stress management, minimizing the cold-form stress by providing support over a large area.

The articles described herein can easily integrate high quality coatings and surface treatments on a curved substrate surface, where such coatings are typically limited to flat parts. The coatings and/or surface treatments may be applied to a glass substrate prior to cold-forming, and cold-forming the coated and/or treated glass substrate in turn avoids the issues associated with thermal forming (i.e., damage to the coating and/or surface treatment from handling and/or high processing temperature).

In some embodiments described herein, the use of a "die" is described. As used herein, a die includes a structure used to impart a desired shape to a glass substrate, and to attach a non-planar rigid support structure to the glass substrate. The die itself is not a part of the finished article, but rather may be used repeatedly to create many finished articles. In one or more embodiments, the term "die" refers to a tool used to impart a desired shape upon an object. In such embodiments, "die" has at least two parts, a first part and a second part, that may be pressed together to impart a desired shape on a flexible object disposed between the first and second parts.

In some embodiments, a non-planar rigid support structure does not cover the glass substrate where the curved displays will be laminated. These areas and the area immediately adjacent do not have the rigid structure bonded to the glass substrate allowing some compliance to accurately match the curved surface of the curved display being laminated to the cover glass assembly.

In some embodiments, direct bonding is used to attach a cold-formed glass substrate to a non-planar rigid support structure.

The non-planar rigid support structure injection molded to the backside of the glass substrate provides a support structure across the glass substrate, leaving exposed the area of the curved display, insuring the non-display areas of the glass substrate are at the design shape. The display area of the glass substrate being open allows some compliance to match the attached curved display. So, the glass substrate is suitable for use as a cover glass for a display.

Various techniques other than injection molding may be used to achieve a non-planar rigid support structure attached to a cold-formed glass substrate to maintain the cold-formed shape and minimize stresses by supporting the curved surface over the area of the part excluding the display area.

The Figures are not necessarily drawn to scale. The different parts of various figures may have some parts not drawn to scale relative to other parts in order to better illustrate concepts.

In some embodiments, injection molding is used to form a non-planar rigid support structure bonded to a surface of a cold-formed glass substrate. Any suitable injection molding process and material(s) may be used. For example, polyvinyl chloride (PVC) and thermoplastic polyurethane (TPU) are two common materials used to injection mold the non-planar rigid support structure. Reaction injection molding (RIM) may be used in some embodiments. Common materials used in RIM include polyurethane polyureas, polyisocyanurates, polyesters, polyphenols, polyepoxides, and nylon 6. Different materials may have different operating parameters. The machines, operating parameters (e.g., pressure, flow rate, temperature), and mold design may be different for different materials. Typical injection molding temperatures range from 300° F. to 450° F., and typical process pressures can range from the 200 psi to higher than 1000 psi. But, any suitable process parameters may be used.

FIG. 1 illustrates an injection mold die 110 designed with a specific desired curved shape, and a flat glass substrate 120 with opposing major surfaces 121 and 122. Injection mold die 110 includes two parts, a first die part 111 and a second die part 112. First and second die parts 111 and 112 have a curved shape corresponding to that desired for a cold-formed glass substrate. First die part 111 includes recesses 113 adapted to receive molten material as a part of an injection-molding process. Flat glass substrate 120 is disposed between first and second die parts 111 and 112, but is not yet cold-formed.

Figure 2:
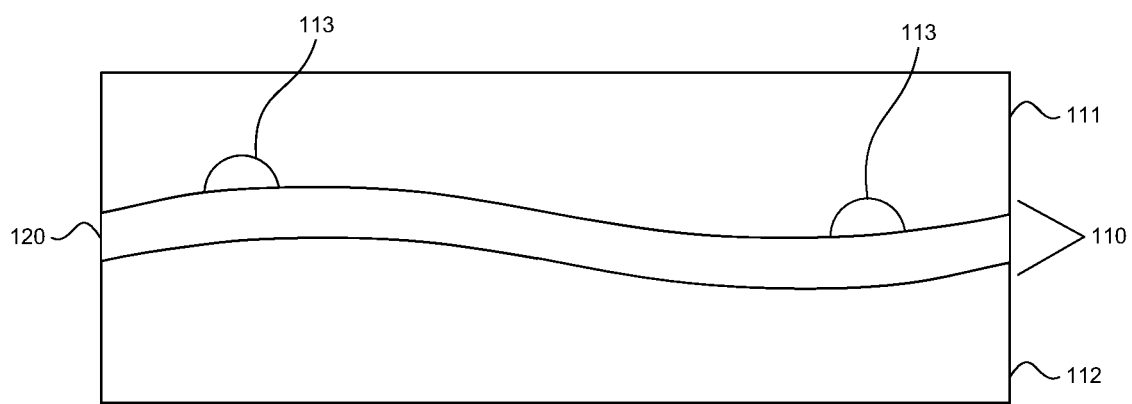
FIG. 2 illustrates the die of FIG. 1 cold-forming the glass substrate into a non-planar shape.

FIG. 2 illustrates the die 110 of FIG. 1 cold-forming glass substrate 120 into a non-planar shape. The cold-forming is accomplished by pressing together first and second die parts 111 and 112 while glass substrate 120 is disposed in between. In FIG. 2, recesses 113 remain empty.

Figure 3:
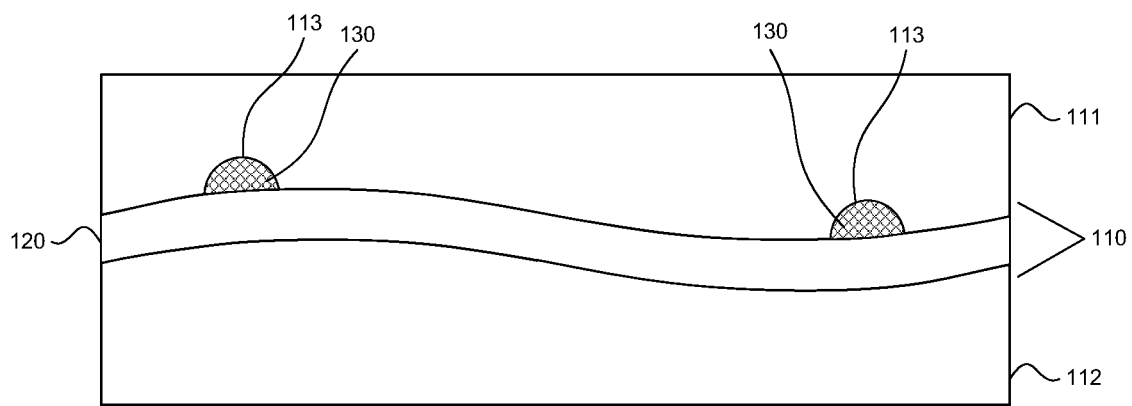
FIG. 3 illustrates the die of FIG. 2 after material has been injection-molded into recesses in the die to form a non-planar rigid support structure bonded to the back of the cold-formed glass substrate.

FIG. 3 illustrates the die of FIG. 2 after material has been injection-molded into recesses 113 to form a non-planar rigid support structure 130 bonded to the back of the cold-formed glass substrate 120.

FIG. 4 illustrates the die of FIG. 3 and the resultant article after first and second die parts 111 and 112 retract. The resultant article is a cold-formed glass substrate 120 bonded to a non-planar rigid support structure 130. Cold-formed glass substrate 120 retains the curvature imparted by first and second die parts 111 and 112 because of the rigidity of non-planar rigid support structure 130. Each of the opposing major surfaces (first major surface 121 and second major surface 122) are in tension or compression depending on the direction of curvature. In FIG. 4, first major surface 121 at a first position 121A that is adjacent the non-planar rigid support structure 130 is in tension while the second major surface 122 at a second position 122A adjacent the non-planar rigid support structure 130 is in compression. Accordingly, the second major surface 122 at a second position 122A exhibits a greater surface compressive stress than the first major surface 121 at a first position 121A. This is exhibited even when substrate 120 is strengthened as described herein and exhibits a surface compressive stress prior to being cold-formed.

FIG. 5 illustrates cold-formed glass substrate 120 bonded to non-planar rigid support structure 130 of FIG. 4, with additional adhesive 140 added along the interface where cold-formed glass substrate 120 is bonded to non-planar rigid support structure 130. Additional adhesive 140 is optional, and may help improve bonding between cold-formed glass substrate 120 and non-planar rigid support structure 130. Although additional adhesive 140 may be applied without using a mold, the overall structure still benefits from the precision obtained by using a mold to bond cold-formed glass substrate 120 to non-planar rigid support structure 130.

Figure 6:
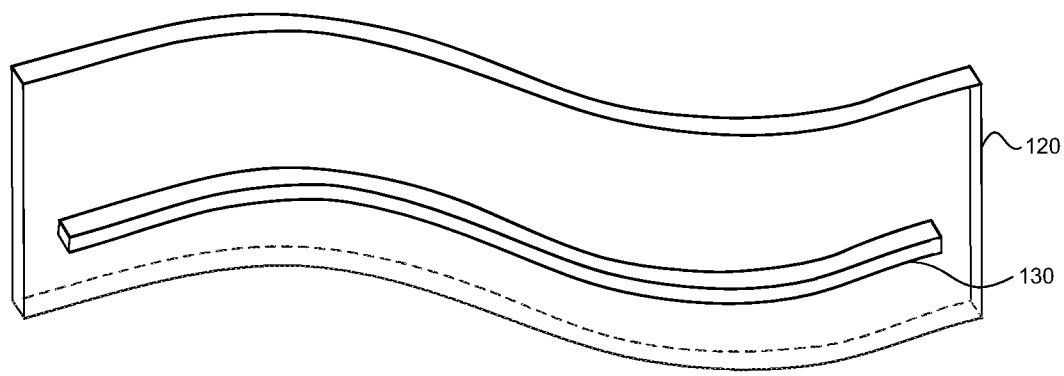
FIG. 6 shows a perspective view of a cold-formed glass substrate bonded to a non-planar rigid support structure.

FIG. 6 illustrates a perspective view of cold-formed glass substrate 120 bonded to a non-planar rigid support structure 130.

Figure 7:
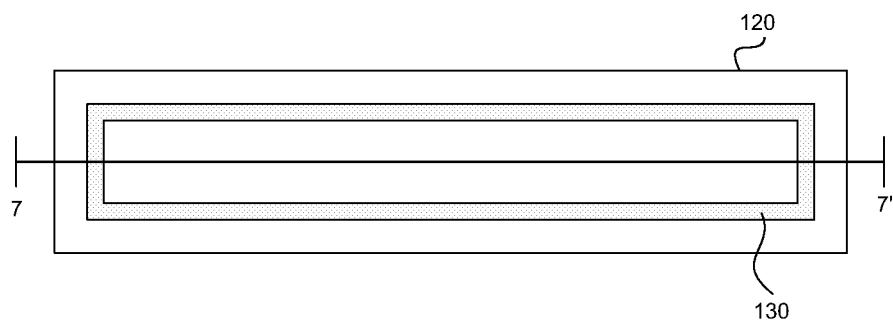
FIG. 7 shows a top view of a cold-formed glass substrate bonded to a non-planar rigid support structure. The curvature is not visible due to the angle of the view.

FIG. 7 illustrates a top view of a cold-formed glass substrate 120 bonded to a non-planar rigid support structure 130. The curvature is not visible due to the angle of the view. Line 7-7' shows a cross section illustrated by FIGS. 1-5. FIGS. 8-11 illustrate a similar cross section.

Figure 8:
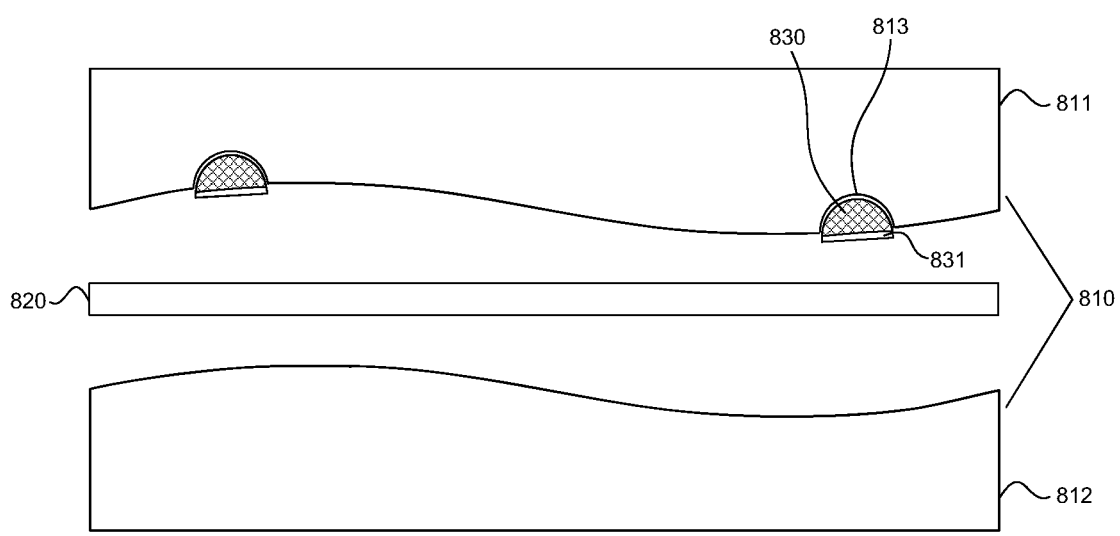
FIG. 8 illustrates a direct-bonding die designed with a specific desired curved shape, and a flat glass substrate. A non-planar rigid support structure has been inserted into recesses in the die.

FIG. 8 illustrates a direct-bonding die 810 designed with a specific desired curved shape, and a flat glass substrate 820. Direct-bonding die 810 includes two parts, a first die part 811 and a second die part 812. First and second die parts

811 and 812 have a curved shape corresponding to that desired for a cold-formed glass substrate. First die part 811 includes recesses 813 adapted to receive a non-planar rigid support structure 830 formed by a separate process. Non-planar rigid support structure 830 may be formed by any suitable process, such as injection molding. Non-planar rigid support structure 830 has been inserted into recesses 831 in first die part 811. Optionally, adhesive layer 831 may be applied to non-planar rigid support structure 830 by any suitable process, before or after non-planar rigid support structure 830 is inserted into recesses 831. Flat glass substrate 820 is disposed between first and second die parts 811 and 812, but is not yet cold-formed.

FIG. 9 illustrates die 810 of FIG. 8 cold-forming glass substrate 820 into a non-planar shape and bonding the non-planar rigid support structure to the cold-formed glass substrate. The cold-forming is accomplished by pressing together first and second die parts 811 and 812 while glass substrate 820 is disposed in between. This pressing together of first and second die parts 811 and 812 also brings non-planar rigid support structure 830 into contact with glass substrate 820, and direct-bonds non-planar rigid support structure 830 to glass substrate 820. Recesses 813 ensure precise positioning of non-planar rigid support structure 830 relative to glass substrate 820.

Figure 10:
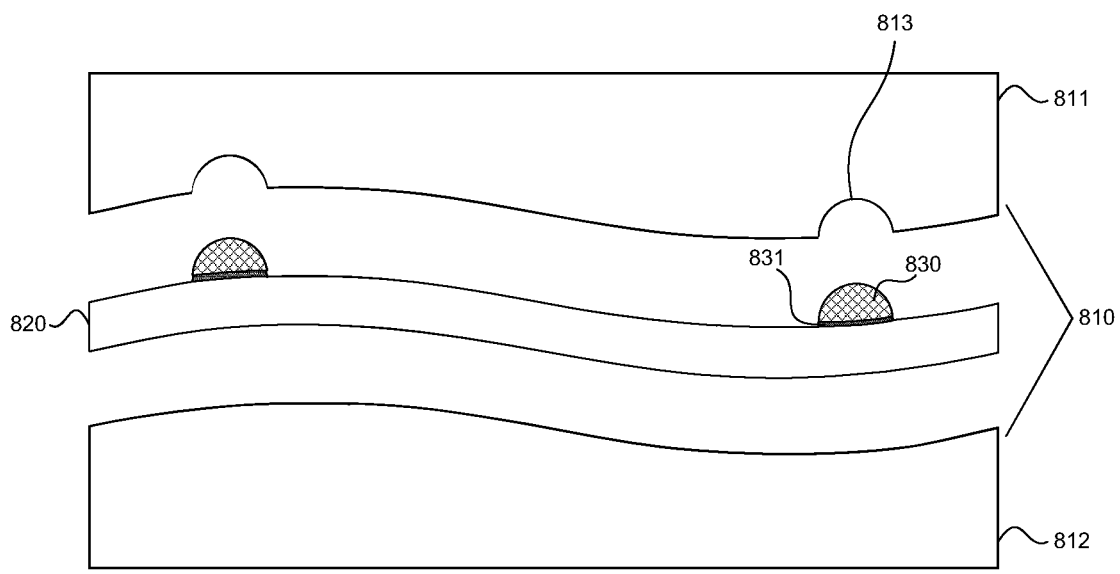
FIG. 10 illustrates the die of FIG. 9 and the resultant article after the die retracts. The resultant article is a cold-formed glass substrate bonded to a non-planar rigid support structure. The cold-formed cover glass substrate retains design curvature because of the rigidity of the structural backside support bonded to the back side of the cover glass.

FIG. 10 illustrates die 810 of FIG. 9 and the resultant article after die 810 retracts. The resultant article is a cold-formed glass substrate 820 bonded to non-planar rigid support structure 820. Optionally, adhesive layer 831 may assist with such bonding. Cold-formed glass substrate 820 retains the curvature imparted by first and second die parts 811 and 812 because of the rigidity of non-planar rigid support structure 830.

Figure 11:
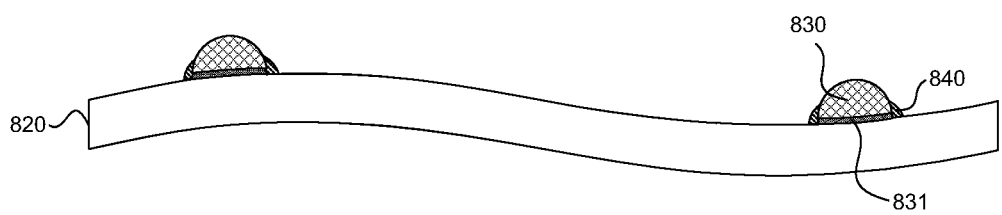
FIG. 11 shows the cold-formed glass substrate bonded to a non-planar rigid support structure of FIG. 10, with additional adhesive.

FIG. 11 illustrates cold-formed glass substrate 820 bonded to non-planar rigid support structure 830 of FIG. 10, with additional adhesive 840 added along the interface where cold-formed glass substrate 820 is bonded to non-planar rigid support structure 830. Additional adhesive 840 is optional, and may help improve bonding between cold-formed glass substrate 820 and non-planar rigid support structure 830. Although additional adhesive 840 may be applied without using a mold, the overall structure still benefits from the precision obtained by using a mold to bond cold-formed glass substrate 820 to non-planar rigid support structure 830.

Figure 12:
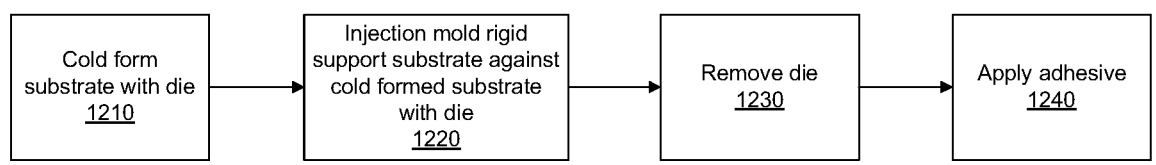
FIG. 12 shows a process flowchart corresponding to the process illustrated in FIGS. 1 to 5.

FIG. 12 shows a process flowchart corresponding to the process illustrated in FIGS. 1 to 5. The following steps are performed, in order:

Step 1210—Die 110 is used to cold-form glass substrate 120 into a desired shape.

Step 1220—Rigid support structure 130 is formed in recesses 113 and bonded to cold-formed glass substrate 120 by injection molding.

Step 1230—Die 110 is removed.

Step 1240—Optionally, additional adhesive 140 is applied.

Figure 13:
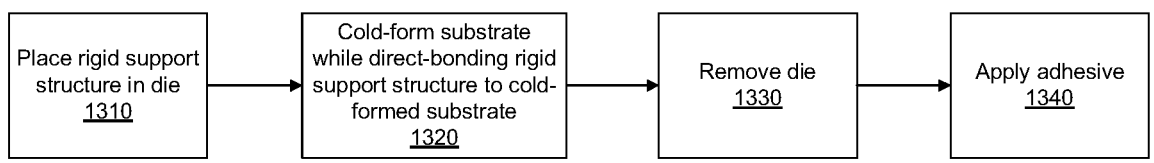
FIG. 13 shows a process flowchart corresponding to the process illustrated in FIGS. 8 to 10.

FIG. 13 shows a process flowchart corresponding to the process illustrated in FIGS. 8 to 10. The following steps are performed, in order:

Step 1310—Rigid support structure 830 is placed in recesses 813.

Step 1320—Die 810 is used to cold-form glass substrate 820 into a desired shape while direct bonding rigid support structure 830 to cold-formed glass substrate 820.

Step 1330—Die 810 is removed.

Step 1340—Optionally, additional adhesive 840 is applied.

Figure 14:
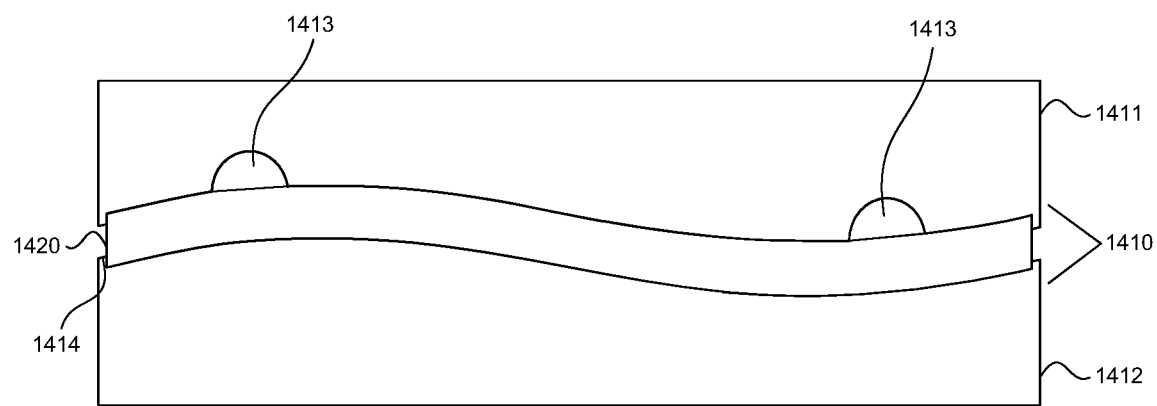
FIG. 14 illustrates a die having ridges that precisely position a glass substrate.

FIG. 14 illustrates a die 1410 having first die part 1411 and second die part 1412. First die part 1413 includes recesses 1413. As illustrated, both first die part 1411 and second die part 1412 include ridges 1414 useful for precisely positioning glass substrate 1420 relative to first and second die parts 1411 and 1412. This allows a rigid support structure to be precisely placed relative to glass substrate 1420, whether by injection molding, direct bonding, or other die-based process. In some embodiments, ridges may be present on only one of first die part 1411 and second die part 1412. In some embodiments, ridges 1414 may be absent.

Figure 15:
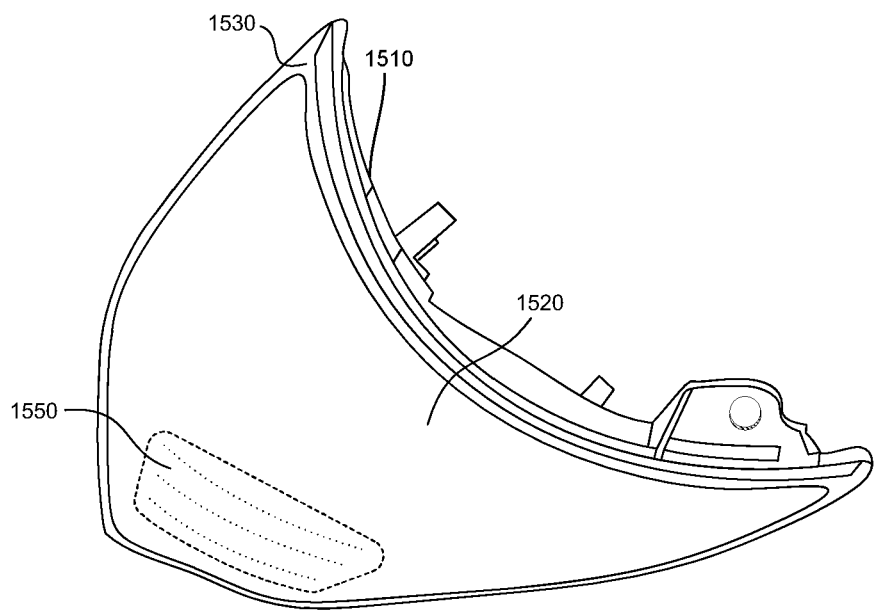
FIG. 15 illustrates an automotive interior display comprising a cold-formed glass substrate bonded to a non-planar rigid support structure.

FIG. 15 shows an example of a part, a section of an automotive interior display, including but not limited to an instrument cluster, a console display, or a center stack display, having a monitor, that may be made in some embodiments. A cold-formed glass substrate is bonded to a rigid support structure 1530. Cold-formed glass substrate 1510 includes an open region 1550 that is not in direct contact with non-planar rigid support structure 1530. Open region 1550 has a curved shape maintained by the non-planar rigid support structure 1530. A monitor or display may be laminated to open region 1550. Rigid support structure 1530 may be designed to be attached to other parts of an automobile (such as a dashboard, center console, instrument panel, seat back, seat front, floorboard, door panel, pillar, arm rest etc.) or an architectural application (such as a wall, window, wall panel, furniture, appliance, door, etc.). The embodiment of FIG. 15 may be formed by any of various processes disclosed herein, including the embodiment of FIG. 12 and the embodiment of FIG. 13.

Figure 16:
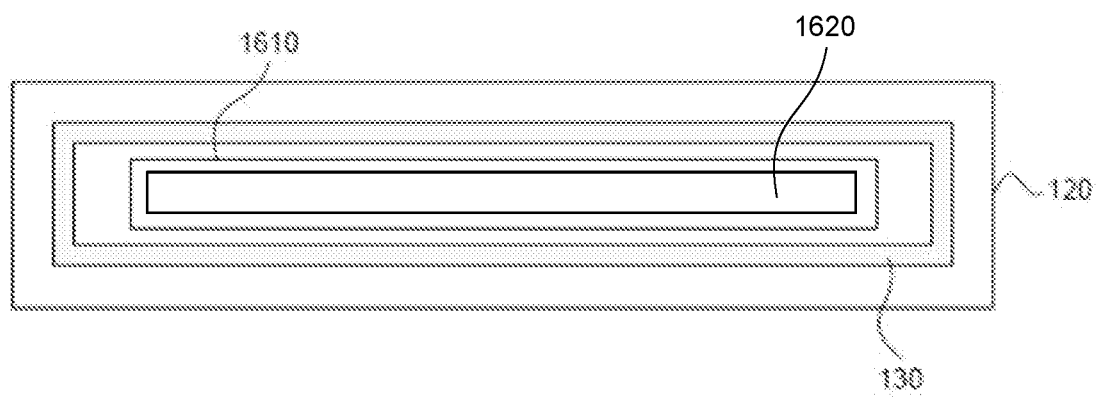
FIG. 16 shows a top view of a cold-formed glass substrate bonded to a non-planar rigid support structure, having a display bonded to the cold-formed glass substrate. The curvature is not visible due to the angle of the view.

FIG. 16 illustrates a top view of a cold-formed glass substrate 120 bonded to a non-planar rigid support structure 130. The curvature is not visible due to the angle of the view. The interior of non-planar rigid support structure 130 defines an open region 1610 of the cold-formed glass substrate that is not in direct contact with the non-planar rigid support structure. Open region 1610 has a curved shape maintained by the non-planar rigid support structure. Display 1620 is attached to cold-formed glass substrate 120. Display 1620 is visible through open region 1610 of cold-formed glass substrate 120.

One or more embodiments pertain to a vehicle interior system that includes a base including a non-planar support structure, and a cold-formed glass substrate (or laminate including a cold-formed substrate, as described herein) disposed on the non-planar support structure. In one or more embodiments, the base includes a display disposed between the base and the cold-formed substrate (or laminate including a cold-formed substrate). The display may be curved. In one or more embodiments, a cold-formed glass substrate comprises a thickness of 1.5 mm or less (or from about 0.4 mm to about 1.3 mm).

In one or more embodiments, the cold-formed glass substrate used in such vehicle interior systems comprises a glass surface, and wherein at all point of the glass surface have a Gaussian curvature (GC) that is equal to zero (GC=$K_{max}$*$K_{min}$, wherein $K_{max}$ and $K_{min}$ are principal curvatures defined as $K_{max}$=1/R' and $K_{min}$=1/R"), and wherein one of $K_{max}$ and $K_{min}$ is non-zero, R' is the maximum radius of curvature and R" is the minimum radius of curvature.

In one or more embodiments, the cold-formed glass substrate (or laminate including a cold-formed substrate, as described herein) used in such vehicle interior systems includes a portion of a surface that comprises a concave shape and an R' of the concave shape is in a range from about 37.5 mm to about 500 mm. In some embodiments with a convex surface, the thickness of the substrate may be 0.4 mm and the R' may be in a range from about 100 mm to about 200 mm, from about 125 mm to about 200 mm, from about 150 mm to about 200 mm, form about 175 mm to about 200 mm, from about 100 mm to about 175 mm, from about 100 mm to about 150 mm, or from about 100 mm to about 125 mm. In some embodiments with a convex surface, the thickness of the substrate may be 0.55 mm and the R' may be in a range from about 150 mm to about 250 mm, from about 175 mm to about 250 mm, from about 200 mm to about 250 mm, form about 225 mm to about 250 mm, from about 150 mm to about 225 mm, from about 150 mm to about 200 mm, or from about 150 mm to about 175 mm. In some embodiments with a convex surface, the thickness of the substrate may be 0.7 mm and the R' may be in a range from about 200 mm to about 300 mm, from about 225 mm to about 300 mm, from about 250 mm to about 300 mm, form about 275 mm to about 300 mm, from about 200 mm to about 275 mm, from about 200 mm to about 250 mm, or from about 200 mm to about 225 mm. In some embodiments with a convex surface, the thickness of the substrate may be 1.1 mm and the R' may be in a range from about 350 mm to about 450 mm, from about 375 mm to about 450 mm, from about 300 mm to about 450 mm, form about 325 mm to about 450 mm, from about 350 mm to about 425 mm, from about 350 mm to about 400 mm, or from about 350 mm to about 375 mm. In some embodiments with a convex surface, the thickness of the substrate may be 1.3 mm and the R' may be in a range from about 450 mm to about 550 mm, from about 475 mm to about 550 mm, from about 400 mm to about 550 mm, form about 425 mm to about 550 mm, from about 450 mm to about 525 mm, from about 450 mm to about 500 mm, or from about 450 mm to about 475 mm.

In one or more embodiments, a portion of a surface that comprises a convex shape and an R' (maximum radius of curvature) of the convex shape is in a range from about 20 mm to about 500 mm. In some embodiments with a concave surface, the thickness of the substrate may be 0.4 mm and the R' may be in a range from about 15 mm to about 100 mm, from about 30 mm to about 100 mm, from about 50 mm to about 100 mm, form about 75 mm to about 100 mm, from about 15 mm to about 75 mm, from about 15 mm to about 50 mm, or from about 15 mm to about 30 mm. In some embodiments with a concave surface, the thickness of the substrate may be 0.55 mm and the R' may be in a range from about 20 mm to about 150 mm, from about 40 mm to about 150 mm, from about 50 mm to about 150 mm, form about 75 mm to about 150 mm, from about 20 mm to about 125 mm, from about 20 mm to about 100 mm, or from about 20 mm to about 75 mm. In some embodiments with a concave surface, the thickness of the substrate may be 0.7 mm and the R' may be in a range from about 25 mm to about 175 mm, from about 50 mm to about 175 mm, from about 75 mm to about 175 mm, form about 100 mm to about 175 mm, from about 150 mm to about 175 mm, from about 25 mm to about 150 mm, from about 25 mm to about 125 mm, from about 25 mm to about 100 mm or from about 25 mm to about 75 mm. In some embodiments with a concave surface, the thickness of the substrate may be 1.1 mm and the R' may be in a range from about 40 mm to about 225 mm, from about 50 mm to about 225 mm, from about 75 mm to about 225 mm, form about 100 mm to about 225 mm, from about 150 mm to about 225 mm, from about 40 mm to about 200 mm, from about 40 mm to about 175 mm, from about 40 mm to about 150 mm or from about 40 mm to about 100 mm. In some embodiments with a concave surface, the thickness of the substrate may be 1.3 mm and the R' may be in a range from about 150 mm to about 250 mm, from about 175 mm to about 250 mm, from about 200 mm to about 250 mm, form about 225 mm to about 250 mm, from about 150 mm to about 225 mm, from about 150 mm to about 200 mm, or from about 150 mm to about 175 mm.

In one or more embodiments, the base comprises any one of a center console, a dashboard, an arm rest, a pillar, a seat back, a floor board, a headrest, a door panel, and a steering wheel. The vehicle may be any one of an automobile, a seacraft, and an aircraft.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that itis within the knowledge of one skilled in the art to affect such feature, structure, or characteristic in connection with other embodiments whether or not explicitly described.

As used herein, "comprising" is an open-ended transitional phrase. A list of elements following the transitional phrase "comprising" is a non-exclusive list, such that elements in addition to those specifically recited in the list may also be present.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Aspect (1) of this disclosure pertains to a process comprising: cold-forming a flat glass substrate into a non-planar shape using a die; and bonding the cold-formed glass substrate to a non-planar rigid support structure at a plurality of non-planar points using the die.

Aspect (2) of this disclosure pertains to the process of Aspect (1), wherein the die is an injection-molding die, and the bonding is accomplished by injection molding the non-planar rigid support structure onto the cold-formed glass substrate while the die holds the cold-formed glass substrate in the non-planar shape.

Aspect (3) of this disclosure pertains to the process of Aspect (1), wherein the non-planar rigid support structure is formed prior to the bonding, and the bonding comprises using the die to directly bond the cold-formed glass substrate onto the non-planar rigid support structure.

Aspect (4) of this disclosure pertains to the process of Aspect (3), further comprising placing the non-planar rigid support structure into a recess in the die prior to bonding.

Aspect (5) of this disclosure pertains to the process of Aspect (3) or Aspect (4), further comprising applying an adhesive to at least one of the non-planar rigid support structure and the flat glass substrate prior to bonding.

Aspect (6) of this disclosure pertains to the process of any one of Aspects (1) through (5), further comprising, after bonding, applying an adhesive to an edge of an interface between the cold-formed glass substrate and the non-planar rigid support structure.

Aspect (7) of this disclosure pertains to the process of any one of Aspects (1) through (6), further comprising applying a coating to the flat glass substrate prior to cold-forming.

Aspect (8) of this disclosure pertains to the process of Aspect (7), wherein the coating is an ink coating.

Aspect (9) of this disclosure pertains to the process of Aspect (7), wherein the coating is an antireflective coating.

Aspect (10) of this disclosure pertains to the process of any one of Aspects (7) through (9), wherein the cold-formed glass substrate, after bonding to the non-planar rigid support structure, includes an open region not in direct contact with the non-planar rigid support structure, the open region having a curved shape maintained by the non-planar rigid support structure.

Aspect (11) of this disclosure pertains to the process of Aspect (10), further comprising attaching a display to at least one of the cold formed glass substrate and the non-planar rigid support structure, such that the display is visible through the open region of the cold-formed glass substrate.

Aspect (12) of this disclosure pertains to the process of any one of Aspects (1) through (11), wherein, during and after cold-forming, the temperature of the glass substrate does not exceed 800° F.

Aspect (13) of this disclosure pertains to the process of any one of Aspects (1) through (12), wherein the glass substrate comprises a strengthened glass.

Aspect (14) of this disclosure pertains to the process of any one of Aspects (1) through (13), wherein the cold-formed glass substrate has opposing major surfaces, and wherein one major surface is free of the non-planar rigid support structure.

Aspect (15) pertains to an article comprising: a cold-formed glass substrate comprising a non-planar shape and a first major surface and an opposing second major surface, the first and second major surfaces comprising a surface compressive stress that differ from one another; a non-planar rigid support structure bonded to the first major surface at a plurality of non-planar points.

Aspect (16) pertains to the article of Aspect (15), wherein: the non-planar rigid support structure is injection molded onto the cold-formed glass substrate while the cold-formed glass comprises the non-planar shape.

Aspect (17) pertains to the article of Aspect (15), wherein the cold-formed glass substrate comprises a second major surface opposite the first major surface, the second major surface comprising a coating or surface treatment.

Aspect (18) of this disclosure pertains to the process of any one of Aspects (15) through (17), further comprising an edge adhesive applied to an edge of an interface between the cold-formed glass substrate and the non-planar rigid support structure.

Aspect (19) of this disclosure pertains to the process of any one of Aspects (15) through (18), wherein the cold-formed glass substrate includes an open region not in direct contact with the non-planar rigid support structure, and the open region has a curved shape maintained by the non-planar rigid support structure.

Aspect (20) pertains to the article of Aspect (19), further comprising a display attached to at least one of the cold formed glass substrate and the non-planar rigid support structure, wherein the display is visible through the cold-formed glass substrate.

Aspect (21) of this disclosure pertains to the process of any one of Aspects (15) through (20), further comprising a coating disposed on the cold-formed glass substrate.

Aspect (22) of this disclosure pertains to the process of Aspect (21), wherein the coating is an ink coating.

Aspect (23) of this disclosure pertains to the process of Aspect (21), wherein the coating is an antireflective coating.

Aspect (24) of this disclosure pertains to an article comprising: a glass substrate having opposing major surfaces and a curved shape, the opposing major surfaces comprising a surface stress that differ from one another, wherein the glass substrate is attached to a rigid support structure having the curved shape, wherein the glass substrate includes an open region not in direct contact with the non-planar rigid support structure, and the open region has a curved shape maintained by the non-planar rigid support structure.

Aspect (25) of this disclosure pertains to an article comprising: a non-planar rigid support structure having a complex developable surface; a cold-formed glass substrate bonded to the non-planar rigid support structure, the cold formed glass substrate having the complex developable surface.

Aspect (26) of this disclosure pertains to the article of Aspect (25) or Aspect (24), further comprising a display attached to at least one of the glass substrate and the non-planar rigid support structure, wherein the display is visible through the open region of the glass substrate.

Aspect (27) of this disclosure pertains to an article of any one of Aspects (24) through (26), further comprising a coating disposed on the glass substrate.

Aspect (28) of this disclosure pertains to an article of Aspect (27), wherein the coating is an ink coating.

Aspect (29) of this disclosure pertains to an article of Aspect (27), wherein the coating is an antireflective coating.

Aspect (30) of this disclosure pertains to an article of any one of Aspects (24) through (29), wherein the glass substrate is a chemically strengthened glass substrate.

Aspect (31) of this disclosure pertains to an article of any one of Aspects (24) through (30), wherein one major surface is free of the non-planar rigid support structure.

Aspect (32) of this disclosure pertains to an article of any one of Aspects (24) through (31), wherein the cold formed glass substrate has a complex developable surface.

Aspect (33) of this disclosure pertains to vehicle interior system comprising: a base having a curved surface; an article comprising a cold-formed glass substrate disposed on the curved surface, wherein the glass substrate comprises a surface, and wherein at all point of the surface have a Gaussian curvature (GC) that is equal to zero (GC=Kmax*Kmin, wherein Kmax and Kmin are principal curvatures defined as Kmax=1/R' and Kmin=1/R"), and wherein one of Kmax and Kmin is non-zero, R' is the maximum radius of curvature and R" is the minimum radius of curvature.

Aspect (34) pertains to the vehicle interior system of Aspect (33), wherein the glass substrate has a thickness of about 1.5 mm or less.

Aspect (35) pertains to the vehicle interior system of Aspect (33) or Aspect (34), wherein a portion of the surface comprises a concave shape and R' of the concave shape is in a range from about 37.5 mm to about 500 mm.

Aspect (36) pertains to the vehicle interior system of Aspect (33) or Aspect (34), wherein a portion of the surface comprises a convex shape and R' of the convex shape is in a range from about 20 mm to about 500 mm.

Aspect (37) pertains to the vehicle interior system of any one of Aspects (33) through (36), further comprising a display.

Aspect (38) pertains to the vehicle interior system of Aspect (37), wherein the display is disposed between the base and the article.

Aspect (39) pertains to the vehicle interior system of Aspect (37) or Aspect (38), wherein the display is curved.

Aspect (40) pertains to the vehicle interior system of any one of Aspects (33) through (39), wherein the glass substrate is strengthened.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

Embodiments described herein may be combined in any permutation.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A system comprising:
   an article, the article comprising:
     a cold-formed glass substrate comprising a first major surface, a second major surface opposite the first major surface, a thickness extending between the first major surface and the second major surface that is greater than or equal to 0.4 mm and less than or equal to 1.3 mm, and a non-planar shape; and
     a non-planar rigid support structure bonded to the glass substrate and configured to retain the cold-formed glass substrate in the non-planar shape, wherein:
       the non-planar rigid support structure is bonded to the first major surface of the cold-formed glass substrate such that the non-planar rigid support retains the cold-formed glass substrate in the non-planar shape despite the first major surface and the second major surface comprising different surface stresses from bending,
       the cold-formed glass substrate is the only glass substrate in the article,
       the cold-formed glass substrate consists of a single sheet of chemically strengthened glass that optionally includes one or more coatings or surface treatments, and
       the non-planar rigid support structure is a component of a base of an automobile interior, wherein the base of the automobile interior comprises a dashboard, a center console, an instrument panel, a seat back, a seat front, a floorboard, a door panel, a pillar, or an arm rest; and
   a display attached to at least one of the cold-formed glass substrate and the non-planar rigid support such that the display is visible through the cold-formed glass substrate, wherein the display comprises touch functionality.

2. The system of claim 1, wherein, when viewed from the second major surface, the cold-formed glass substrate completely covers the non-planar rigid support structure.

3. The system of claim 1, wherein the display is a curved display and the non-planar shape substantially matches a shape of the display.

4. The system of claim 3, wherein the non-planar shape comprises a curved shape such that at least one of the first major surface and the second major surfaces comprises a concave or a convex shape, wherein the concave or the convex shape comprises a radius of curvature that is greater than or equal to 20 mm and less than or equal to 500 mm.

5. The system of claim 1, wherein the display is laminated to an open region of the first major surface that is not in direct contact with the non-planar rigid support.

6. The system of claim 1, wherein the cold-formed glass substrate comprises a Gaussian curvature that is equal to zero.

7. The system of claim 1, wherein the non-planar rigid support structure is bonded to the first major surface atone or more non-planar points on the first major surface that are offset from a minor surface of the cold-formed glass substrate extending between the first major surface and the second major surface.

8. The system of claim 1, wherein the non-planar rigid support structure is formed on and bonded to the first major surface by injection molding without the use of adhesive.

9. The system of claim 1, wherein an outer edge of the non-planar rigid support structure is disposed inward of a minor surface of the cold-formed glass substrate extending between the first major surface and the second major surface.

10. A system comprising:
    an article, the article comprising:
      a cold-formed glass substrate comprising a first major surface, a second major surface opposite the first major surface, a thickness extending between the first major surface and the second major surface that is greater than or equal to 0.4 mm and less than or equal to 1.3 mm, and a curved shape; and
      a non-planar rigid support structure comprising a developable surface that is bonded to the first major surface of the cold-formed glass substrate, wherein:
        the non-planar rigid support structure retains the cold-formed glass substrate in the curved shape despite the first major surface and the second major surface comprising different surface stresses from bending,
        the cold-formed glass substrate is the only glass substrate in the article,
        the cold-formed glass substrate consists of a single sheet of chemically strengthened glass that optionally includes one or more coatings or surface treatments, and
        the non-planar rigid support structure is a component of a base of an automobile interior, wherein the base of the automobile interior comprises a dashboard, a center console, an instrument panel, a seat back, a seat front, a floorboard, a door panel, a pillar, or an arm rest; and
    a curved display laminated to a region of the first major surface not in direct contact with the non-planar rigid support, wherein the cold-formed glass substrate is bent such that the curved shape matches a shape of a curved surface of the curved display in the region, wherein the curved display comprises touch functionality.

11. The system of claim 10, wherein, when viewed from the second major surface, the cold-formed glass substrate completely covers the non-planar rigid support structure.

12. The system of claim 10, wherein the cold-formed glass substrate comprises a Gaussian curvature that is equal to zero.

13. The system of claim 10, wherein the non-planar rigid support structure is bonded to the first major surface at one or more non-planar points on the first major surface that are offset from a minor surface of the cold-formed glass substrate extending between the first major surface and the second major surface.

14. The system of claim 10, wherein the non-planar rigid support structure is formed on and bonded to the first major surface by injection molding without the use of adhesive.

15. The system of claim 10, wherein an outer edge of the non-planar rigid support structure is disposed inward of a minor surface of the cold-formed glass substrate extending between the first major surface and the second major surface.

16. A system comprising:
an article, the article comprising:
  a cold-formed glass substrate comprising a first major surface, a second major surface opposite the first major surface, a thickness extending between the first major surface and the second major surface that is greater than or equal to 0.4 mm and less than or equal to 1.3 mm, and a curved shape; and
  a non-planar rigid support structure comprising a curved surface that is bonded to the first major surface of the cold-formed glass substrate, wherein:
    the non-planar rigid support structure retains the cold-formed glass substrate in the curved shape despite the first major surface and the second major surface comprising different surface stresses from bending,
    the cold-formed glass substrate is the only glass substrate in the article,
    the cold-formed glass substrate consists of a single sheet of chemically strengthened glass that optionally includes one or more coatings or surface treatments,
    an edge interface between one or more minor surfaces of the cold-formed glass substrate and the non-planar rigid support structure comprises an adhesive applied thereto,
    the non-planar rigid support structure is a component of a base of an automobile interior, wherein the base of the automobile interior comprises a dashboard, a center console, an instrument panel, a seat back, a seat front, a floorboard, a door panel, a pillar, or an arm rest; and
  a display attached to at least one of the cold-formed glass substrate and the non-planar rigid support structure.

17. The system of claim 16, wherein the cold-formed glass substrate comprises a Gaussian curvature that is equal to zero.

18. The system of claim 16, wherein the non-planar rigid support structure is bonded to the first major surface at one or more non-planar points on the first major surface that are offset from the minor surface of the cold-formed glass substrate extending between the first major surface and the second major surface.

19. The system of claim 16, wherein the non-planar rigid support structure is formed on and bonded to the first major surface by injection molding without the use of adhesive.

20. The system of claim 16, wherein the display is curved and comprises touch functionality.

* * * * *